US012072617B2

United States Patent
Hirakawa et al.

(10) Patent No.: US 12,072,617 B2
(45) Date of Patent: Aug. 27, 2024

(54) LIGHT SOURCE OPTICAL SYSTEM, LIGHT SOURCE DEVICE, LIGHT SOURCE UNIT, AND IMAGE DISPLAY APPARATUS

(71) Applicant: Ricoh Company, Ltd., Tokyo (JP)

(72) Inventors: Makoto Hirakawa, Tokyo (JP); Yohei Takano, Kanagawa (JP); Kasumi Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/137,445

(22) Filed: Apr. 21, 2023

(65) Prior Publication Data

US 2023/0251559 A1    Aug. 10, 2023

Related U.S. Application Data

(63) Continuation of application No. 17/533,119, filed on Nov. 23, 2021, now Pat. No. 11,669,004.

(30) Foreign Application Priority Data

Nov. 27, 2020 (JP) .................................. 2020-196706
Aug. 30, 2021 (JP) .................................. 2021-139519

(51) Int. Cl.
*G03B 21/20* (2006.01)
*F21V 8/00* (2006.01)
(Continued)

(52) U.S. Cl.
CPC ....... *G03B 21/204* (2013.01); *G02B 27/1066* (2013.01); *G02B 27/283* (2013.01);
(Continued)

(58) Field of Classification Search
CPC .......... G03B 21/204; G03B 21/2066; G03B 21/208; G03B 21/2073; G03B 33/08;
(Continued)

(56) References Cited

U.S. PATENT DOCUMENTS 5,453,877 A    9/1995  Gerbe et al.
9,223,134 B2  12/2015  Miller et al.
(Continued)

FOREIGN PATENT DOCUMENTS

CN     1882868 A   12/2006
CN   103713456 A    4/2014
(Continued)

OTHER PUBLICATIONS

Chinese Office Action issued Jul. 14, 2023, in corresponding Chinese Patent Application No. 202111293138.1, 9pp.
(Continued)

*Primary Examiner* — Tsion Tumebo

(74) *Attorney, Agent, or Firm* — XSENSUS LLP

(57) ABSTRACT

A light source optical system includes: a first optical system configured to guide a first light beam having a first wavelength emitted from a light source to a wavelength conversion element; the wavelength conversion element configured to convert the first light beam into a second light beam having a second wavelength different from the first wavelength, and emit the second light beam; and a second optical system through which the second light beam emitted from the light conversion element passes. The second optical system includes a light guide element configured to guide a portion of the second light beam from one end surface of the light guide element to the other end surface of the light guide element to separate the portion of the second light beam from the second light beam.

18 Claims, 14 Drawing Sheets

(51) Int. Cl.
  *G02B 6/10* (2006.01)
  *G02B 6/27* (2006.01)
  *G02B 27/10* (2006.01)
  *G02B 27/28* (2006.01)

(52) U.S. Cl.
  CPC ....... *G03B 21/2066* (2013.01); *G03B 21/208* (2013.01); *G02B 6/0056* (2013.01); *G02B 6/105* (2013.01); *G02B 6/2773* (2013.01)

(58) Field of Classification Search
  CPC .......................... G03B 21/142; G03B 21/206; G02B 27/1066; G02B 27/283; G02B 6/0056; G02B 6/105; G02B 6/2773; G02B 26/008; G02B 19/0057
  See application file for complete search history.

(56) References Cited

U.S. PATENT DOCUMENTS

| | | | |
|---|---|---|---|
| 11,181,814 | B2 | 11/2021 | Sakata et al. |
| 2007/0140616 | A1 | 6/2007 | Sugita et al. |
| 2010/0033685 | A1 | 2/2010 | Seo et al. |
| 2010/0118535 | A1 | 5/2010 | Kusukame et al. |
| 2014/0098349 | A1 | 4/2014 | Nagasawa et al. |
| 2015/0219896 | A1* | 8/2015 | Ouderkirk ................ G02B 5/30 359/630 |
| 2016/0004147 | A1 | 1/2016 | Hu et al. |
| 2016/0290604 | A1* | 10/2016 | Hikmet ................ G02B 6/0006 |
| 2017/0090274 | A1 | 3/2017 | Aizaki |
| 2017/0168381 | A1 | 6/2017 | Akiyama et al. |
| 2017/0343891 | A1 | 11/2017 | Sakata et al. |
| 2018/0284585 | A1 | 10/2018 | Trisnadi et al. |
| 2018/0329282 | A1 | 11/2018 | Akiyama |
| 2019/0004409 | A1 | 1/2019 | Nishikawa et al. |
| 2019/0041735 | A1 | 2/2019 | Tanaka |
| 2019/0041737 | A1 | 2/2019 | Yasumatsu |
| 2019/0041740 | A1 | 2/2019 | Yasuda et al. |
| 2019/0268578 | A1 | 8/2019 | Koizumi |
| 2019/0293965 | A1 | 9/2019 | Liao |
| 2020/0026172 | A1 | 1/2020 | Sakata et al. |
| 2020/0285138 | A1 | 9/2020 | Kurata et al. |
| 2020/0301262 | A1* | 9/2020 | Fan .......................... F21V 9/30 |
| 2020/0301266 | A1 | 9/2020 | Nakamura et al. |
| 2021/0389652 | A1 | 12/2021 | Takano et al. |

FOREIGN PATENT DOCUMENTS

| | | |
|---|---|---|
| CN | 106483598 A | 3/2017 |
| CN | 106873292 A | 6/2017 |
| CN | 107436528 A | 12/2017 |
| CN | 110476010 A | 11/2019 |
| CN | 110737163 A | 1/2020 |
| JP | WO2009104392 A1 | 8/2009 |
| JP | 2015-206888 | 11/2015 |
| JP | 2017-215496 A | 12/2017 |
| JP | 2020-160434 A | 10/2020 |
| WO | 2008/078820 A1 | 7/2008 |
| WO | WO2014/196015 A1 | 12/2014 |

OTHER PUBLICATIONS

Decision of Grant issued Dec. 19, 2023 in Chinese Patent Application No. 202111293138.1, 4 pages.

* cited by examiner

FIG. 6
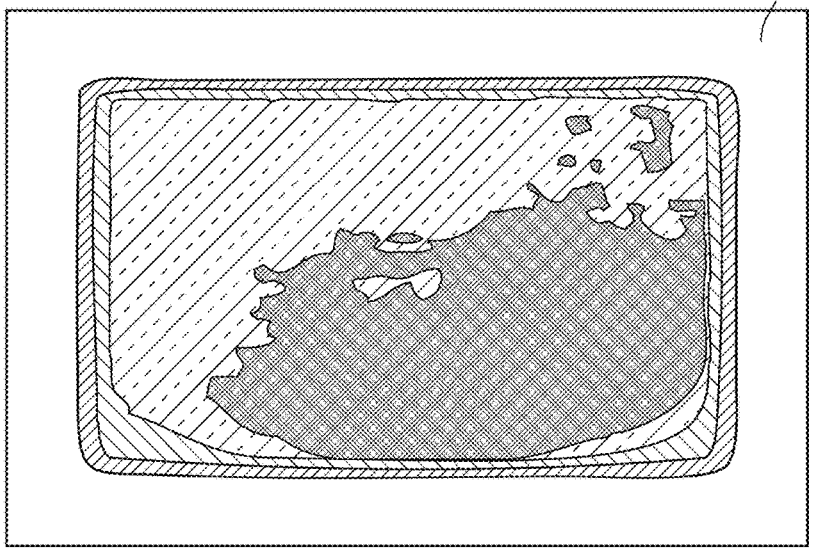
EXAMPLE
TABLE 1
| 89% | 87% | 88% |
|-----|-----|-----|
| 84% | 88% | 92% |
| 81% | 89% | 95% |
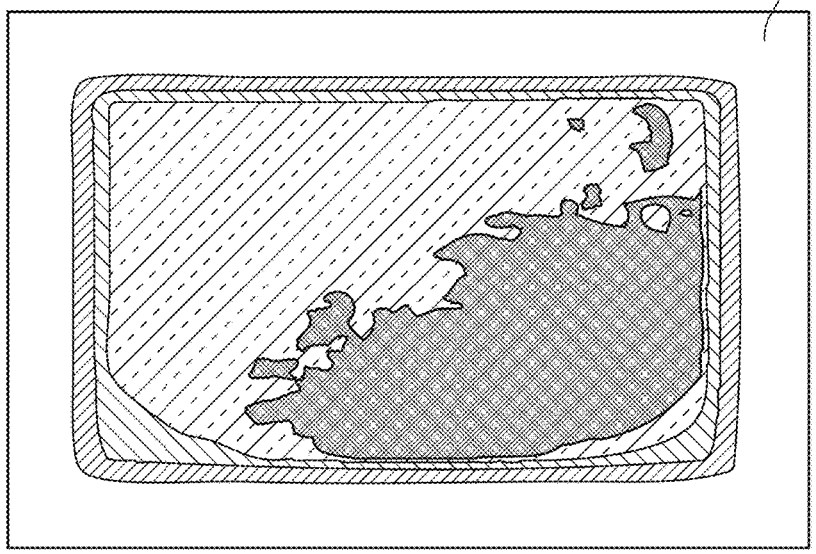
COMPARATIVE EXAMPLE
TABLE 2
| 86% | 86% | 90% |
|-----|-----|-----|
| 81% | 85% | 93% |
| 79% | 87% | 95% |
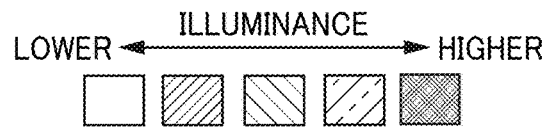
LOWER ←― ILLUMINANCE ―→ HIGHER

FIG. 10
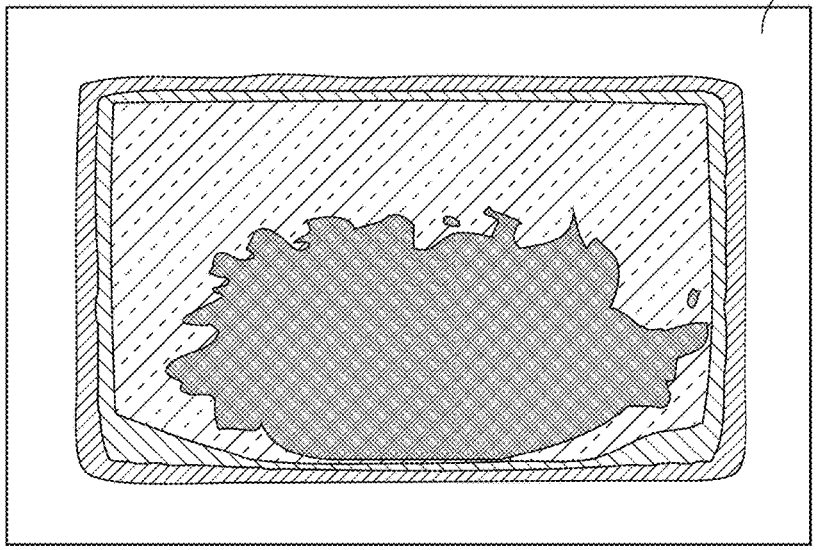
EXAMPLE
TABLE 3
| 87% | 88% | 86% |
|---|---|---|
| 91% | 93% | 88% |
| 88% | 100% | 95% |
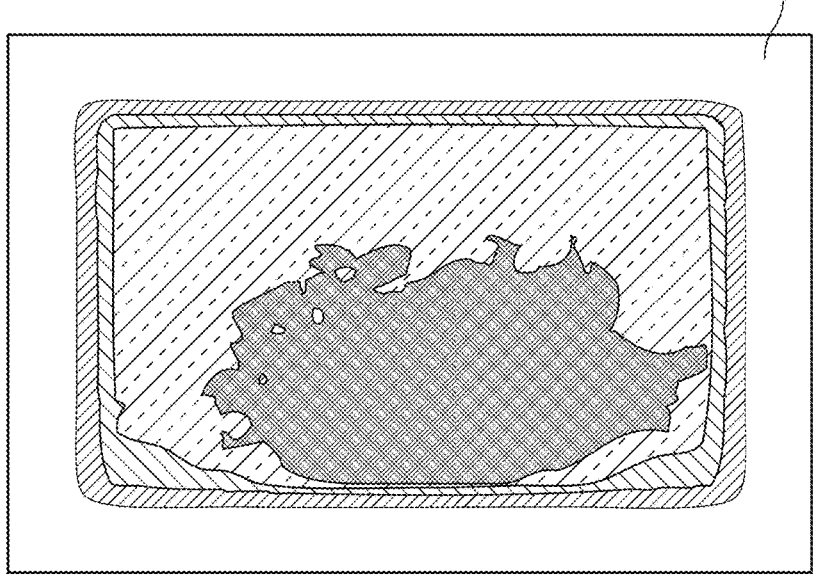
COMPARATIVE EXAMPLE
TABLE 4
| 85% | 87% | 86% |
|---|---|---|
| 88% | 93% | 88% |
| 87% | 99% | 95% |
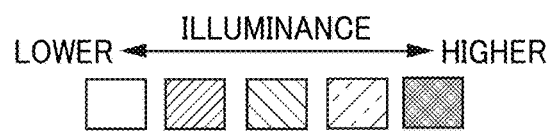
ILLUMINANCE
LOWER ←————→ HIGHER

FIG. 15
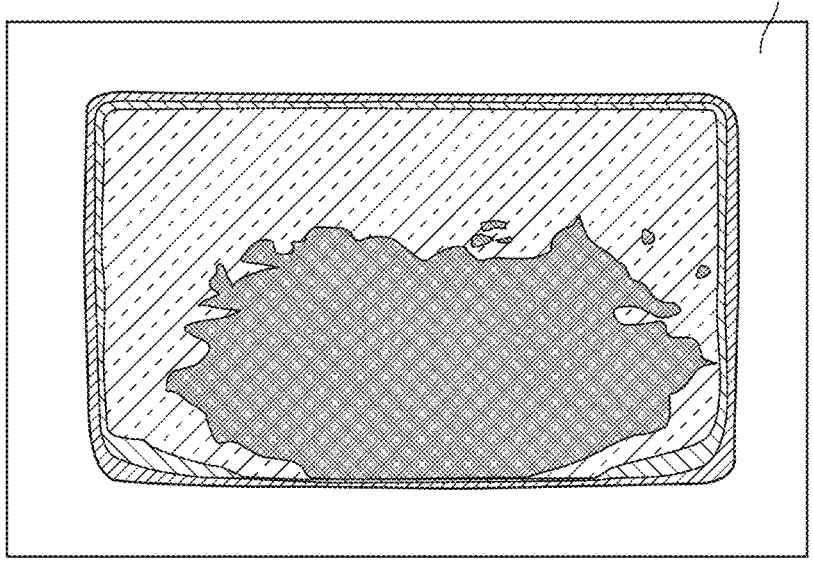
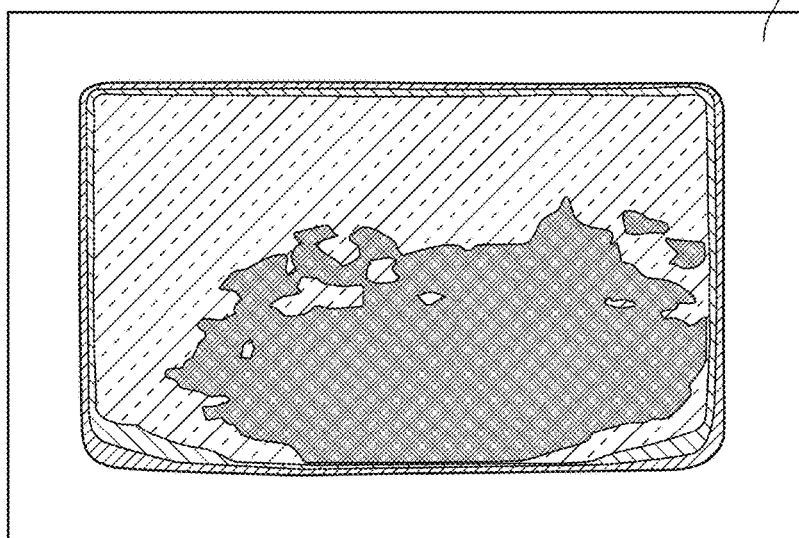

LIGHT SOURCE OPTICAL SYSTEM, LIGHT SOURCE DEVICE, LIGHT SOURCE UNIT, AND IMAGE DISPLAY APPARATUS

CROSS-REFERENCE TO RELATED APPLICATIONS

This patent application is a continuation of U.S. patent application Ser. No. 17/533,119, filed on Nov. 23, 2021, which is based on and claims priority pursuant to 35 U.S.C. § 119(a) to Japanese Patent Application No. 2020-196706, filed on Nov. 27, 2020, and Japanese Patent Application No. 2021-139519, filed on Aug. 30, 2021, in the Japan Patent Office, the entire disclosures of each are incorporated by reference herein.

BACKGROUND

Technical Field

The present disclosure relates to a light source optical system, a light source device, a light source unit, and an image display apparatus.

Related Art

Projectors (image display devices and image projection devices) that magnify and project various images onto a screen are widely used. In projectors, light emitted from a light source is condensed on an image display element, or spatial light modulation element such as a digital micromirror device (DMD) or a liquid crystal display element, and light modulated in accordance with a video signal and emitted from the image display element is displayed as a color image on a projection surface such as a screen.

Projectors in many cases use, for example, an ultra-high pressure mercury lamp having high brightness as a light source. However, the life of such a lamp is shorter and frequent maintenance is required. In recent years, the number of projectors using a laser or a light emitting diode (LED) as a light source, instead of the ultra-high pressure mercury lamp, is growing. Such projectors using a laser or an LED as a light source have a longer life and higher color reproducibility due to its monochromaticity than the ultra-high mercury lamp.

SUMMARY

A light source optical system includes: a first optical system configured to guide a first light beam having a first wavelength emitted from a light source to a wavelength conversion element; the wavelength conversion element configured to convert the first light beam into a second light beam having a second wavelength different from the first wavelength, and emit the second light beam; and a second optical system through which the second light beam emitted from the light conversion element passes. The second optical system includes a light guide element configured to guide a portion of the second light beam from one end surface of the light guide element to the other end surface of the light guide element to separate the portion of the second light beam from the second light beam.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 is an illustration of an illuminance distribution for the light source device according to the first embodiment;

FIG. 10 is an illustration of an illuminance distribution for the light source device according to the second embodiment;

FIG. 15 is an illustration of an illuminance distribution for the light source device according to the fourth embodiment.

Figure 1:
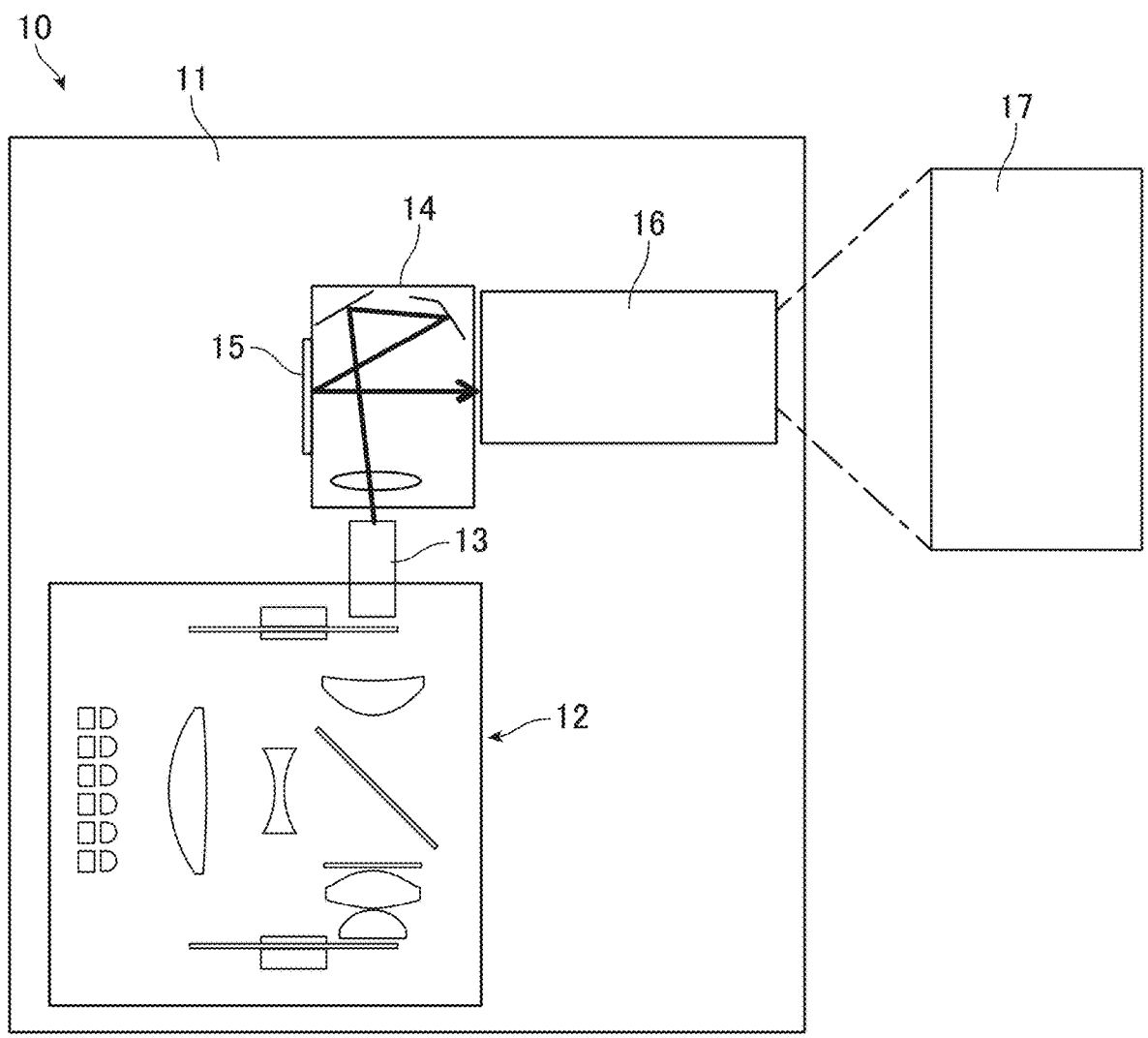
FIG. 1 is a schematic view of an entire configuration of a projector (image display apparatus)

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

Embodiments of the present disclosure provide a light source optical system, a light source unit, a light source device, and an image display apparatus that achieves an improvement in an illuminance distribution with a simple configuration.

Figure 11:
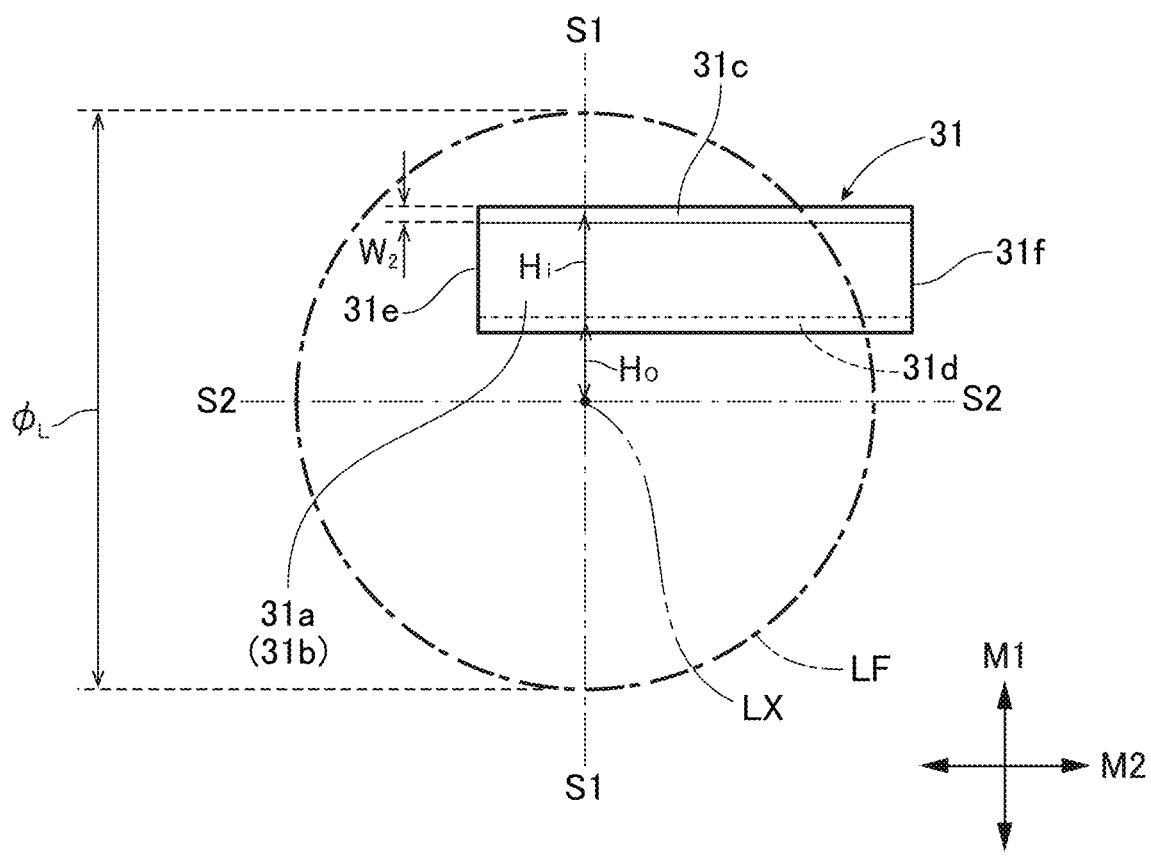
FIG. 11 is a front view of a configuration of a light guide element in the light source device according to a third embodiment.
Figure 16:
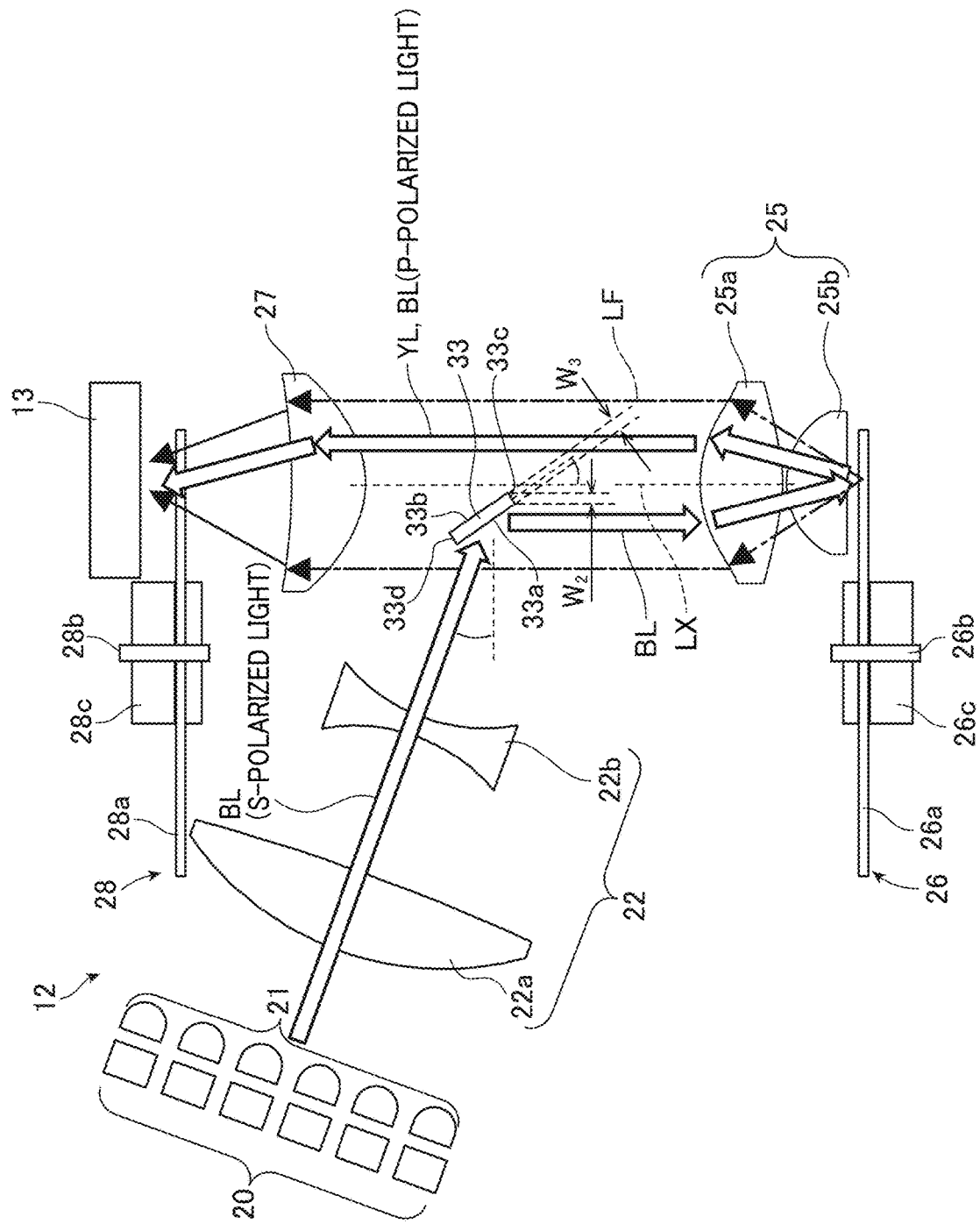
FIG. 16 is a schematic view of a configuration of a light source device according to a fifth embodiment.

Hereinafter, embodiments of the present invention are described with reference to the drawings. FIG. 1 is a schematic view of the entire configuration of a projector as an example of an image display apparatus. FIGS. 2 to 16 illustrate embodiments of the light source device as a light source unit refers to. Specifically, FIGS. 2 to 6 illustrate a first embodiment, and FIGS. 7 to 10 illustrate a second embodiment. FIG. 11 illustrates a third embodiment, and FIGS. 12 to 15 illustrate a fourth embodiment. Further, FIG. 16 illustrates a fifth embodiment refers to.

In projectors, a color image is formed by irradiating an image display element such as a DMD with color light, for example red, green, and blue (i.e., three primary colors of light). These three colors can be generated by using laser light source for the colors. However, this is not desirable because luminous efficacies of a green laser and a red laser are lower than efficacy of a blue laser. Thus, a method using a phosphor and a blue laser as excitation light is used. In the method, the phosphor is irradiated with blue light emitted by the blue laser to generate fluorescence (i.e., wavelength conversion), which generated green light and red light.

A projector 10 illustrated in FIG. 1 includes a housing 11, a light source device 12 as a light source unit, a light uniformizing element 13, an illumination optical system 14, an image display element 15, and a projection optical system 16. All these elements, the light source device 12, the light uniformizing element 13, the illumination optical system 14, the image display element 15, and the projection optical system 16 are housed in the housing 11.

The light source device 12 emits light beams including wavelengths corresponding to, for example, red (R), green (G), and blue (B) colors. The inner configuration of the light source device 12 is described later in detail.

The light uniformizing element 13 mixes and uniformizes light beam emitted from the light source device 12. The light uniformizing element 13 is, for example, a hollow light tunnel enclosed by four mirror plates facing inside, a rod integrator having geometry of a cylinder or a prism of transparent material such as glass, or a fly-eye lens in which multiple lenses are arrayed in two dimensions.

The illumination optical system 14 substantially uniformly illuminates the image display element 15 with the light beam uniformized by the light uniformizing element 13. The illumination optical system 14 includes, for example, at least one lens and one optical element having at least one reflection surface.

The image display element 15 is, for example, a light valve such as a digital micromirror device (DMD), a transmissive liquid crystal panel, or a reflective liquid crystal panel. The image display element 15 modulates light (i.e., light from the light source device 12) passed through the illumination optical system 14 and forms an image with the modulated light.

The projection optical system 16 magnifies and projects the image formed by the image display element 15 onto a screen 17 (e.g., projection surface) disposed outside the projector 10. The projection optical system 16 includes, for example, at least one lens.

Figure 2:
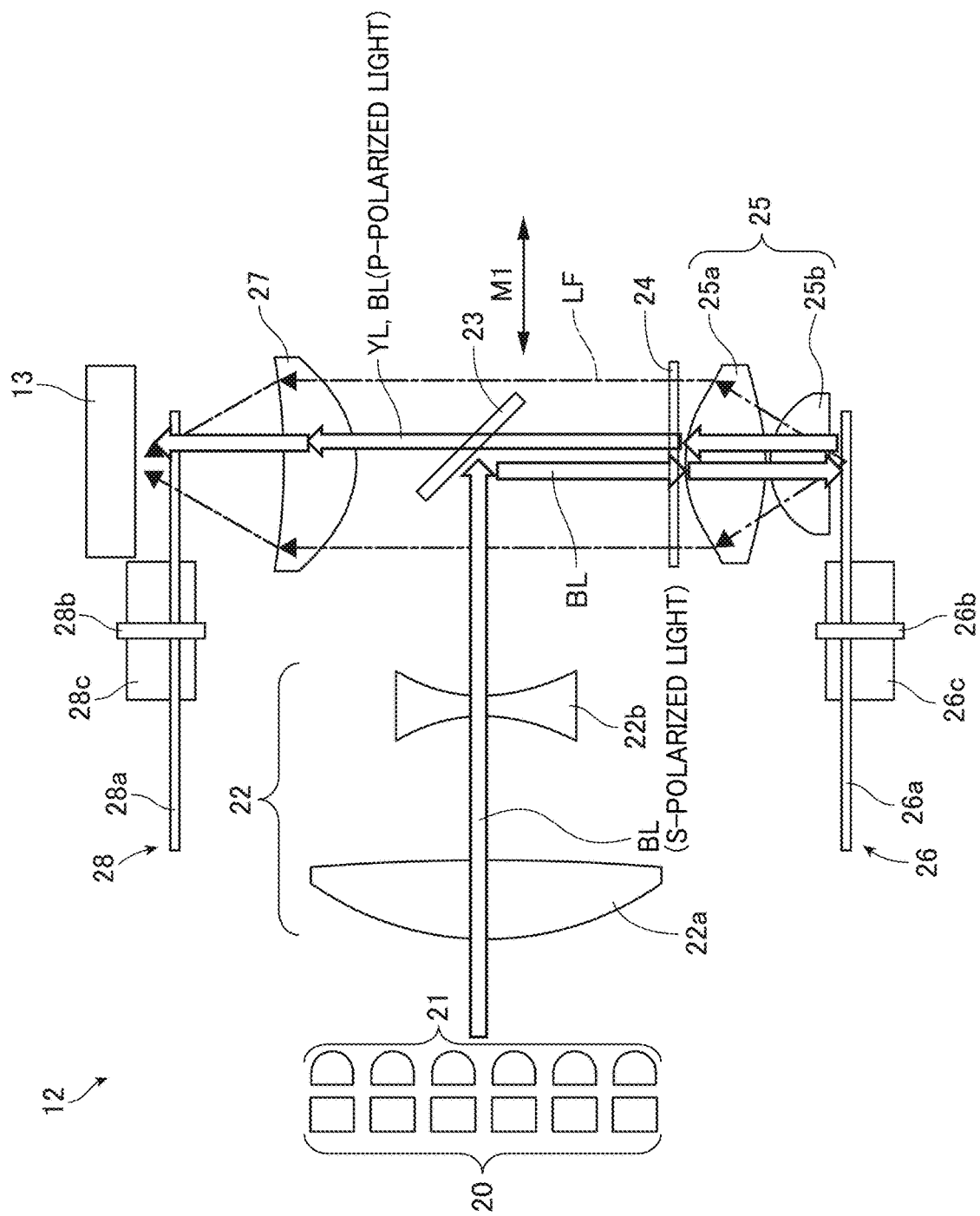
FIG. 2 is a schematic view of a configuration of a light source device according to a first embodiment.

FIG. 2 is a schematic view of a configuration of a light source device 12 according to a first embodiment. The light source device 12 includes a laser light source group 20 (light source group), a collimator lens group 21, a first lens group 22, a light guide element 23, a quarter-wave plate 24, a second lens group 25, a phosphor wheel 26 (wavelength conversion element), a third lens group 27, and a color wheel 28, which are arranged in this order along a light propagation direction. For example, components of the light source device 12 other than the laser light source group 20 constitute the light source device 12 excluding the laser light source group 20.

The laser light source group 20 includes at least one laser light source (solid-state light source). The collimator lens group 21 includes at least one collimator lens. In FIG. 2, six light sources arranged in a direction parallel to an optical axis of the second optical system (i.e., parallel to the propagation direction of YL, BL (P-POLARIZED LIGHT) is depicted. Moreover, additional six light sources are arranged in n rows, where n is an integer of 2 or more, in a direction perpendicular to the drawing sheet in which FIG. 2 is illustrated. Thus, 6×n light sources are two-dimensionally arrayed. There is a latitude in the number of laser light sources in the laser light source group 20. The laser light source group 20 may be, for example, a single laser light source having high power instead of multiple laser light sources.

Multiple laser light sources in the laser light source group 20 may be arranged in two-dimensional array on a substrate (i.e., two-dimensional light source array) as a light source unit, but there is a latitude in a specific aspect thereof. Hereinafter, the laser light source group 20 may be referred to as "the two-dimensional light source array".

Figure 3A:
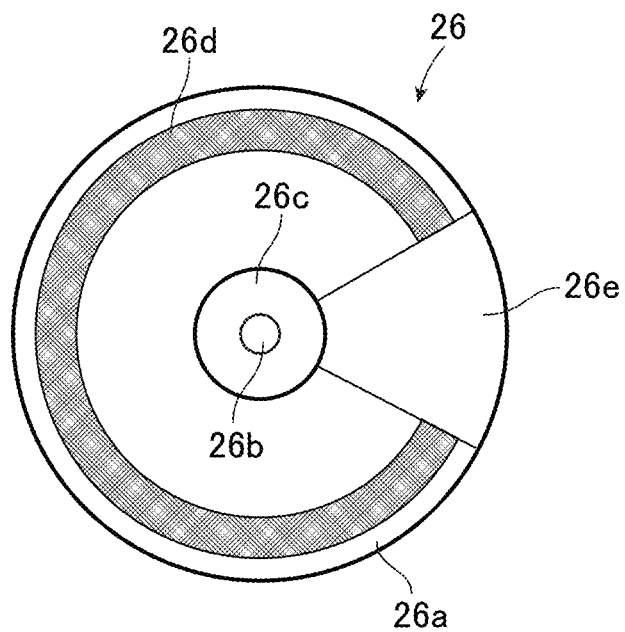
FIG. 3A is a front view of a configuration of a phosphor wheel in the light source device in FIG. 2.
Figure 3B:
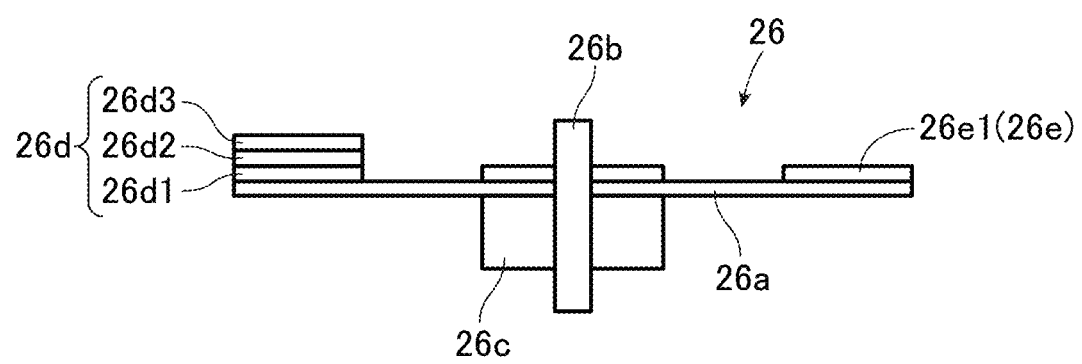
FIG. 3B is a cross-sectional view of the phosphor wheel in FIG. 3A.

The two-dimensional light source array emits, for example, blue laser light in a wavelength band of blue having a central wavelength of 455 nm, which is excitation light BL (i.e., first color light) that excites a phosphor provided in a phosphor region 26d (i.e., a wavelength-conversion region) in the phosphor wheel 26 in FIGS. 3A and 3B. The blue laser light emitted by the two-dimensional light source array (the laser light source group 20) is linearly polarized and has a constant polarization state. The blue laser light is s-polarized light with respect to an incident surface (a front surface 23a to be described later) of the light guide element 23. The blue laser light emitted by the two-dimensional light source array (the laser light source group 20) is coherent light. The excitation light BL emitted by the laser light source group 20 may be light having a wavelength to excite the phosphor in the phosphor region 26d of the phosphor wheel 26, but is not limited to light having the wavelength band of blue.

Multiple collimator lenses of the collimator lens group 21 in FIG. 2 are two-dimensionally arrayed and correspond to the multiple laser light sources of the two-dimensional light source array (the laser light source group 20). Multiple collimator lenses of the collimator lens group 21 are adjusted to collimate or converge the light (i.e., excitation light BL) emitted from the multiple laser light sources of the two-dimensional light source array (i.e., the laser light source group 20) to generate parallel light or convergent light. The number of the collimator lenses of the collimator lens group 21 coincides with the number of laser light sources of the laser light source group 20, and the number of the collimator lenses may be increased or decreased in proportional to the number of light sources of the laser light source group 20.

The first lens group 22 has a positive power as a lens group and includes a positive lens 22a and a negative lens 22b in this order along a light propagation direction from the laser light source group 20 to the phosphor wheel 26. The excitation light BL emitted from the collimator lens group 21 is parallel light or converging light and enters the first lens group 22. The first lens group 22 guides the excitation light BL to the light guide element 23 while converging the excitation light BL. The first lens group 22 may have a negative power instead of a positive power as a lens group.

The light guide element 23 is disposed in an optical path between the first lens group 22 and the second lens group 25. The light guide element 23 is, for example, a polarization beam splitter of a flat plate and has a coating that reflects s-polarized light (i.e., first polarized light component) in the wavelength band of the excitation light BL guided from the first lens group 22 and transmits p-polarized light (i.e., second polarized light component) in the wavelength band of the excitation light BL and the fluorescent light YL (second color light) emitted from the phosphor wheel 26.

In the present embodiment, the light guide element 23 reflects the s-polarized light in the wavelength band of the excitation light BL and transmits the p-polarized light in the wavelength band of the excitation light BL. Alternatively, the light guide element 23 may reflect the p-polarized light in the wavelength band of the excitation light BL and transmit the s-polarized light in the wavelength band of the excitation light BL.

The quarter-wave plate 24 (¼ wavelength plate) is arranged to have its optical axis (i.e., fast axis or slow axis of the quarter-wave plate 24) tilted by 45 degrees with respect to the linearly polarized light of the excitation light BL reflected by the light guide element 23. The quarter-wave plate 24 converts the excitation light BL reflected by the light guide element 23 from the linearly polarized light into circularly polarized light.

The second lens group 25 has positive power as a lens group and includes positive lenses 25a and 25b in this order along the light propagation direction from the laser light source group 20 to the phosphor wheel 26. The excitation light BL is converted into circularly polarized light by the quarter-wave plate 24 and enters the second lens group 25. The second lens group 25 guides the excitation light BL to the phosphor wheel 26 while converging the excitation light BL.

The excitation light BL guided from the second lens group 25 hits the phosphor wheel 26. FIGS. 3A and 3B are illustrations of the configuration of the phosphor wheel 26. The phosphor wheel 26 includes a disc member 26a and a driving motor 26c that rotates the disc member 26a about a rotational axis 26b. The disc member 26a is, for example, a transparent substrate or a metal substrate such as an aluminum substrate, but is not limited thereto.

In the disc member 26a of the phosphor wheel 26, a major portion of the disc member 26a in the circumferential direction (e.g., an angular range of larger than 270 degrees in the present embodiment) is a phosphor region 26d, and the remaining portion of the disc member 26a in the circumferential direction (e.g., an angular range of smaller than 90 degrees in the present embodiment) excluding the phosphor region 26d is an excitation light reflection region 26e that reflects the excitation light BL (FIG. 3A).

The phosphor region 26d includes a reflection coating 26d1, a phosphor layer 26d2, and an antireflection coating 26d3 layered in this order from the bottom, or the disc member 26a (FIG. 3B).

The reflection coating 26d1 has a property of reflecting light in a wavelength band of the fluorescent light YL emitted by the phosphor layer 26d2. When a metal substrate having higher reflectivity is used for the disc member 26a, the reflection coating 26d1 may be omitted (i.e., the disc member 26a has a function of reflecting light such as the reflection coating 26a1).

The phosphor layer 26d2 is, for example, a layer in which a phosphor material is dispersed at least one of an organic binder and an inorganic binder, a layer in which a phosphor material is directly crystalized, or a layer including rare earth phosphors such as Ce:YAG. As a wavelength band of the fluorescent light YL emitted by the phosphor layer 26dd2, for example, yellow, blue, green, or red can be used. In the present embodiment, the fluorescent light YL having a wavelength band of yellow is used. In the present embodiment, a phosphor is used as the wavelength conversion element, but a phosphorescent material or a nonlinear optical crystal may be used.

The antireflection coating 26d3 has a property of preventing reflection of light on a surface of the phosphor layers 26d2.

On the excitation light reflection region 26e of the excitation light BL, a reflection coating 26e1 is laminated. The reflection coating 26e1 has a property of reflecting light in a wavelength band of the excitation light BL guided from the second lens group 25. When a metal substrate having higher reflectivity is used for the disc member 26a, the reflection coating 26e1 may be omitted (i.e., the disc member 26a serves to reflect light such as the reflection coating 26a1).

An irradiation area on the phosphor wheel 26, which is irradiated with the excitation light BL, moves with time as the disc member 26a is rotated by the driving motor 26c. As a result, the excitation light BL incident on the phosphor wheel 26 is divided by time (i.e., time-division manner) into two states: a state in which the excitation light BL is converted into the fluorescence light YL having a wavelength different from the wavelength of the excitation light BL in the phosphor region 26d and the fluorescence light YL is emitted; and a state in which the excitation light BL incident on the phosphor wheel 26 is reflected by the excitation light reflection region 26e and emitted from the phosphor wheel 26 as is.

There is a latitude in the number and the angular range of the phosphor region 26d and the excitation light reflective region 26e, and various designs are possible. For example, two fluorescent regions and two excitation light reflection regions may be alternately arranged at intervals of 90 degrees in the circumferential direction of the phosphor wheel 26.

Referring back to FIG. 2, the light source device 12 is described. The excitation light BL reflected by the excitation light reflection region 26e of the phosphor wheel 26 has a reverse circular polarization direction (i.e., right-handed circular polarization to left-handed circular polarization or left-handed circular polarization to right-handed circular polarization) and propagates from the phosphor wheel 26 to the light guide element 23. The circular polarized light (i.e., the excitation light BL) reflected by the excitation light reflection region 26e is converted into substantially parallel light from a divergent light by the second lens group 25 and is then converted into p-polarized light by the quarter-wave plate 24. The excitation light BL converted into the p-polarized light passes through the light guide element 23 and enters the color wheel 28 through the third lens group 27 that condenses light. In the embodiment, the third lens group 27 includes a single lens.

The excitation light BL incident on the phosphor region 26d of the phosphor wheel 26 is converted into the fluorescent light YL, and the fluorescent light YL is emitted from the phosphor region 26d. The fluorescent light YL emitted by the phosphor region 26d is converted into a substantially parallel light beam from a divergent light beam by the second lens group 25 and passes through the quarter-wave plate 24 and the light guide element 23 to enter the color wheel 28 through the third lens group 27.

The color wheel 28 includes a disc member 28a and a driving motor 28b that rotates the disc member 28a about a rotational axis 28c. The disc member 28a has a blue region, a yellow region, a red region, and a green region partitioned in a circumferential direction. The blue region is synchronized with the excitation light reflection region 26e of the phosphor wheel 26, and the yellow region, the red region, and the green region are synchronized with the phosphor region 26d of the phosphor wheel 26. The yellow region transmits light having a wavelength band of yellow as is, which is emitted from the phosphor wheel 26. The red region and the green region are provided with one or more dichroic mirrors to allow the color wheel 28 to selectively transmit light of red color or green color from the wavelength band of yellow (i.e., light of the other colors excluding red color and green color is reflected by the dichroic mirrors). As a result, high-purity color light is obtained.

As illustrated in FIG. 1, light of each color produced by the color wheel 28 in the time-division manner is guided (irradiated) from the light uniformizing element 13 to the image display element 15 through the illumination optical system 14 and forms an image corresponding to each color. The image corresponding to each color is magnified and projected on to the screen 17 by the projection optical system 16. As a result, a color image is formed. In other words, the image display element 15 modulates light from the light source device 12 to form an image, and the projection optical system 16 magnifies and projects the image formed by the image display element 15 onto the screen 17.

In the light source optical system of the light source device 12 in the projector 10 described above, a first optical system includes the first lens group 22, the light guide element 23, the quarter-wave plate 24, and the second lens group 25, forming an optical path through which a first light beam emitted by the laser light source group 20 passes to the phosphor wheel 26. The first optical system may include the collimator lens group 21.

Figure 4A:
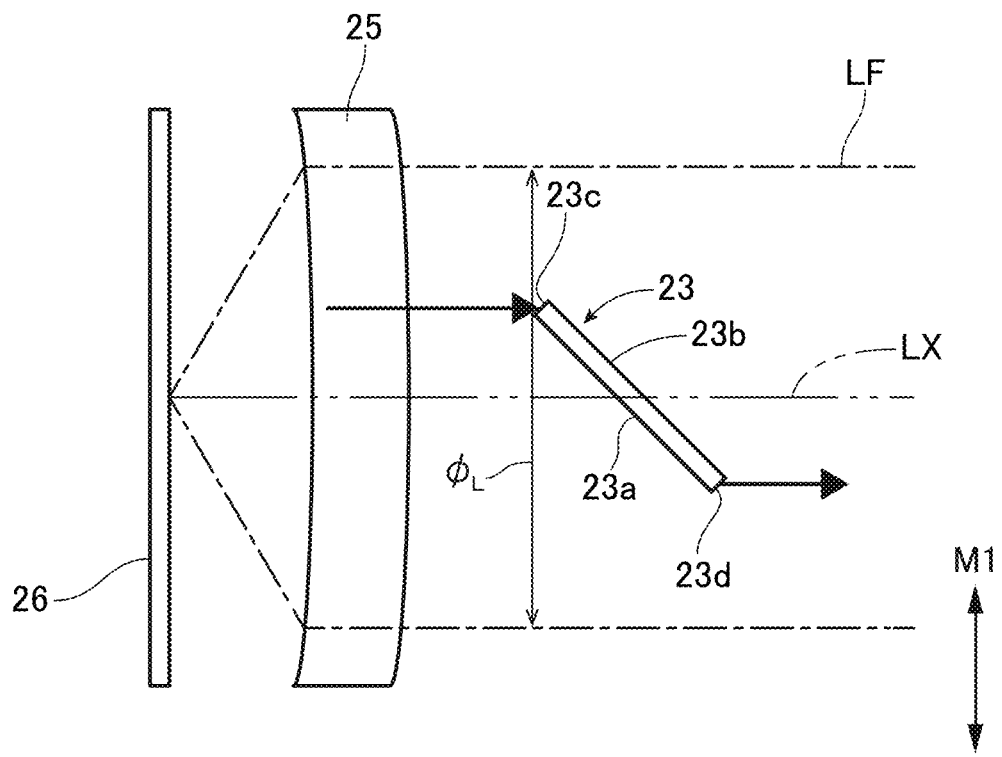
FIG. 4A is a side view of a configuration of a light guide element according to the first embodiment.
Figure 4B:
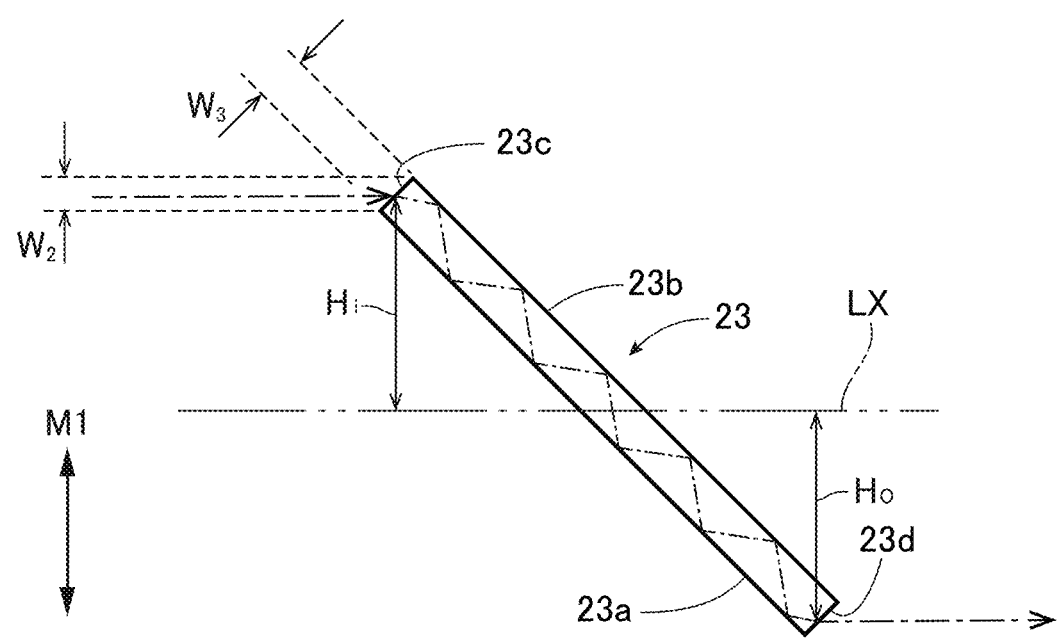
FIG. 4B is an enlarged view of a cross section of the light guide element in FIG. 4A.
Figure 5:
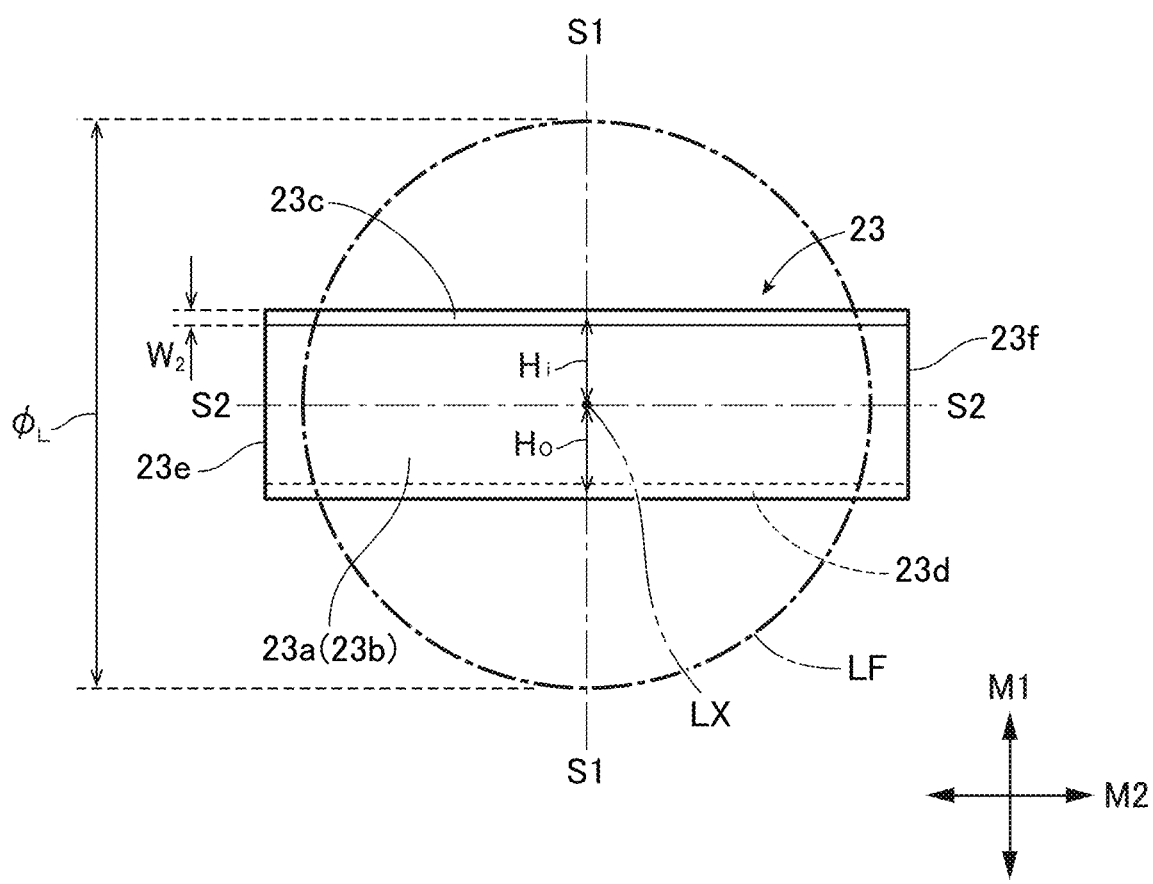
FIG. 5 is a front view of a configuration of the light guide element according to the first embodiment.

In the light source optical system of the light source device 12, a second optical system includes the second lens group 25, the quarter-wave plate 24, the light guide element 23, and the third lens group 27, forming an optical path through which a second light beam having the wavelength converted by the phosphor wheel 26 (i.e., a second light beam wavelength-converted from the first light beam by the wavelength conversion element) passes. The optical axis LX of the second optical system is illustrated in FIGS. 4A, 4B and 5. The second light beam LF is illustrated in FIGS. 2, 4A and 5. FIG. 5 is a front view of the light guide element 23 along the optical axis LX as viewed from the phosphor wheel 26.

The light guide element 23 works as a reflection element that reflects the first light beam entered from the first lens group 22 toward the phosphor wheel 26 in the first optical system. The light guide element 23 also works as a splitter to partially guide the second light beam propagating toward the third lens group 27 from the second lens group 25 in the second optical system. Features of the light guide element 23 are described below in detail.

In FIGS. 4A, 4B, and 5, the light guide element 23 is, for example, a parallel flat plate of transparent glass or resin and has a front surface 23a and a back surface 23b, which are parallel to each other. As the light guide element 23 works as a polarization beam splitter, the front surface 23a has a coating that reflects the s-polarized light in the wavelength band of the excitation light BL and transmits the p-polarized light in the wavelength band of the excitation light BL and fluorescence light YL.

In FIG. 5, the light guide element 23 includes four end surfaces: a longer-side end surface 23c (first end surface); a longer-side end surface 23d (second end surface); a shorter-side end surface 23e; and a shorter-side end surface 23f, where the longer-side end surface 23c and the longer-side end surface 23d (second end surface) are a parallel pair and extending along the longer-side of the light guide element 23, and the shorter-side end surfaces 23e and the shorter-side end surface 23f are a parallel pair and extending along the shorter-side of the light guide element 23. The longer-side end surface 23c, the longer-side end surface 23d, the shorter-side end surface 23e, and shorter-side end surface 23f are substantially perpendicular to each of the front surface 23a and the back surface 23b. The longer-side end surface 23c and the longer-side end surface 23d are also substantially perpendicular to the shorter-side end surface 23e and the shorter-side end surface 23f. The light guide element 23 is supported and fixed by a support member in the vicinity of the shorter-side end surfaces 23e and 23f outside the second light beam LF.

A direction in which the optical axis of the first lens group 22 extends is defined as a direction M1 in FIGS. 2, 4A, and 4B. The direction M1 is perpendicular to the optical axis LX of the second optical system. The light guide element 23 is disposed so that the longer-side of the light guide element 23 is tilted in a direction M2 perpendicular to the direction M1 and the optical axis LX.

As illustrated in FIGS. 4A, 4B, and 5, the light guide element 23 is disposed so that the front surface 23a and the back surface 23b are tilted by about 45 degrees with respect to the optical axis LX as viewed in the direction M2 (i.e., as viewed from the shorter-side end surface 23e and the shorter-side end surface 23f). In the direction along the optical axis LS, the front surface 23a faces the phosphor wheel 26, or the second lens group 25, and the back surface 23b faces the color wheel 28, or the third lens group 27.

In the light guide element 23 as viewed from the front side along the optical axis LX, as illustrated in FIG. 5, the front surface 23a and the longer-side end surface 23c face the phosphor wheel 26. The front surface 23a having a larger projection area as viewed from the front side is a first surface, and the longer-side end surface 23c having a smaller projection area is a second surface. A first light beam is reflected toward the phosphor wheel 26 by the front surface 23a as the first surface.

In the light guide element 23 as viewed from the back side along the optical axis LX, the back surface 23b and the longer-side end surface 23d face the color wheel 28, or the third lens group 27. A projection area in the back view of the back surface 23b is larger than that of the longer-side end surface 23d.

The light guide element 23 is disposed so that the optical axis LX passes through the center of an outer shape of the light guide element 23 in the front view and the back view. More specifically, in the front view of the light guide element 23 in FIG. 5, the optical axis LX passes through the center of the length along the shorter-side between the longer-side end surface 23c and the longer-side end surface 23d of the light guide element 23 and the center of the length along the longer-side between the shorter-side end surface 23e and the shorter-side end surface 23f of the light guide element 23. As illustrated in FIG. 5, when a virtual plane S1 including the optical axis LX along the direction M1 and the virtual plane S2 including the optical axis LX along the direction M2 are set, the configuration of the light guide element 23 in the front view and the back view is symmetrical with respect to both the virtual plane S1 and the virtual plane S2 (i.e., the virtual plane S1 passes through the center of the longer-side of the light guide element 30 and the virtual plane S2 passes through the center of the shorter-side of the light guide element 30).

In the direction M1, the length of the light guide element 23 in the shorter-side direction in the front view is entirely within the range of the second light beam LF. In other words, in the direction M1, both the longer-side end surface 23c and the longer-side end surface 23d are within the range of the optical path through which the second light beam LF passes.

In the direction M2, the length of the light guide element 23 in the longer-side direction thereof is slightly larger than the diameter of the second light beam LF, and a portion of each end of the light guide element 23 around the shorter-side end surface 23e and the shorter-side end surface 23f, in the longer-side direction are outside the range of the diameter the second light beam LF.

In other words, the front surface 23a, the back surface 23b, the longer-side end surface 23c, and the longer-side end surface 23d of the light guide element 23 are disposed within the diameter of the second light beam LF excluding the portions of the ends of the light guide element 23 in the direction M2 (i.e., the longer-side direction). In contrast, the shorter-side end surface 23e and the shorter-side end surface 23f are disposed outside the range of the second light beam LF.

The second light beam LF including the fluorescent light YL wavelength-converted by the phosphor region 26d of the phosphor wheel 26 and the excitation light BL reflected by the excitation light reflection region 26e is converted from a diverging light beam into a substantially parallel light beam by the second lens group 25 and reaches the light guide element 23. As illustrated in FIG. 5, the front surface 23a and the back surface 23b occupy a most portion of the light guide element 23 disposed in the second light beam LF. In the most portion of the light guide element 23, the second light beam LF directly passes toward the third lens group 27. The longer-side end surface 23c of the light guide element 23 is disposed at a place on which a portion of the second light beam LF from the phosphor wheel 26 is incident.

As illustrated in FIGS. 4A and 4B, a portion of the second light beam LF enters the light guide element 23 from the longer-side end surface 23c and propagates through the light guide element 23 while repeating total internal reflection multiple times to exit from the longer-side end surface 23d. Specifically, in the light guide element 23, the light beam entered from the longer-side end surface 23c is reflected multiple times on each of the front surface 23a and the back surface 23b and guided to the longer-side end surface 23d to exit. As described above, the light guide element 23 directly transmits the second light beam LF through the front surface 23a and the back surface 23b and separates a portion of the second light beam from the second light beam LF in the second optical system. In other words, a portion of the second light beam passes through the light guide element 23 in the second optical system. As a result, in the second optical system, a distribution of light quantity in the second light beam LF differs before and after passing through the light guide element 23.

More specifically, the light guide element 23 is arranged so that the longer-side end surface 23c of a light incident side is disposed on one region in the direction M1 direction divided by the virtual plane S2, and the longer-side end surface 23d of a light emission side is disposed on the other region in the M1 direction in FIG. 5. The light guide element 23 guides a portion of the second light beam LF from the one region to the other region across the virtual plane S2.

By providing the light guide element 23 working as described above in the second optical system, an illuminance distribution on an irradiation surface (i.e., image display element 15) of illumination light emitted from the light source device 12 is changed. By appropriately arranging the direction and the magnitude of guiding light of the light guide element 23, the illuminance distribution on the irradiation surface (i.e., image display element 15) improves.

The light guide element 23 reflects the first light beam emitted from the laser light source group 20 in the first optical system toward the phosphor wheel 26 and partially separates the second light beam in the second optical system. The light guide element 23 works in both the first optical system and the second optical system, which makes the optical system simple (i.e., simple configuration). The illuminance distribution improves with the simple configuration having less optical elements.

A portion of the second light beam LF by the light guide element 23 is guided within the optical path of the second optical system (inside the diameter of the second light beam LF). As a result, loss of the light quantity caused by guiding light in the light guide element 23 stops and the illuminance distribution improves without decreasing the light use efficiency in the light source device 12.

In addition, the illuminance distribution can substantially be changed by repeating the total internal reflection multi times while guiding light inside the light guide element 23

As illustrated in FIG. 5, the light guide element 23 has the length of the diameter of the second light beam LF in the longer-side direction. This configuration enables the entirety of the second light beam LF in the longer-side direction (i.e., the direction M2) of the light guide element 23 to undergo the adjustment of the illuminance distribution by the light guide element 23.

In the projector 10, there is a correlation between the illuminance distribution of illumination light at the image display element 15 and the illuminance distribution on the screen 17. To prevent changes in the illuminance distribution due to other factors such as the action of the projection optical system 16, the light guide element 32 is arranged to separate (pass) light as appropriate in the second optical system. This improves the light distribution of the light source device 12, or the projector 10, thus advantageously reducing the unevenness of the distribution of illuminance on the screen 17.

FIG. 6 is an illustration of the results of the experiments and measurements demonstrating reduction in the unevenness of the illuminance distribution by the light guide element 23. In FIG. 6, the graph of the "example" is an illuminance distribution on the screen 17 obtained by an experiment using the light guide element 23 that separated (guided) a portion of the second light beam from the second light beam LF and the graph of "comparative example" is an illuminance distribution on the screen 17 obtained by an experiment without guiding light by the light guide element 23. In the example, the longer-side end surface 23c and the longer-side end surface 23d of the light guide element 23 were configured to transmit light (i.e., transmission surface), and the light entered the light guide element 23 from the longer-side end surface 23c and exited from the longer-side end surface 23d of the light guide element 23. In the comparative example, the longer-side end surface 23c and the longer-side end surface 23d of the light guide element 23 were configured to absorb light (i.e., absorption surface), and the light did not enter the light guide element 23 from the longer-side end surface 23c and did not exit from the longer-side end surface 23d of the light guide element 23. When a full-on image (i.e., all pixels in the image display element 15 are on) was projected onto the screen 17 under the same condition excluding the difference between the transmission surface and the absorption surface described above, the illuminance distribution illustrated in FIG. 6 was obtained.

As illustrated in FIG. 6, an unevenness of an illuminance distribution in the example is smaller than that of comparative example, and the unevenness of the illuminance distribution on the screen 17 improves. In particular, in an area from the center to the upper left portion of the screen 17 of the comparative example in FIG. 6, the unevenness of the illuminance distribution is lager (i.e., an area of lower illuminance spreads). In contrast, in the example, the unevenness of the illuminance distribution is advantageously reduced (i.e., an area of higher illuminance spreads).

As an example, evaluation of the illuminance distribution on the screen 17 is described below. The illuminance on the screen 17 is normalized as the maximum value in the illuminance distribution on the screen is 100%. An image projection area on the screen 17 projected by the projector 10 is equally divided into nine rectangular regions, and an average of illuminance is calculated for each region. In addition, an average of the illuminance of the nine regions is calculated. By referring to the average calculated in this manner, the unevenness of the illuminance distribution on the screen 17 is quantitatively evaluated.

In FIG. 6, Table 1 represents the average of the illuminance of each of the nine regions on the screen 17 in the example, and Table 2 represents the average of the illuminance of each of the nine regions on the screen 17 in the comparative example. The averages of the illuminance calculated based on the values of Tables 1 and 2 are 88.0% in the example and 86.9% in the comparative example, and the unevenness of the illuminance distribution on the screen 17 reduces in the example as compared with the comparative example.

In the present embodiment, an angle formed by the normal line of the second surface (the longer-side end surface 23c) of the light guide element 23 and the optical axis LX of the second optical system is 45 degrees, an average $W_3$ of a length of the second surface (the longer-side end surface 23c) in a direction perpendicular to the ridge line formed by the first surface (the longer-side end surface 23c) and the second surface (the longer-side end surface 23c) of the light guide element 23 is 0.9 mm, and the diameter $\phi_L$ of the second light beam LF at a position of the ridge line formed by the first surface (the front surface 23a) and the second surface (the longer-side end surface 23c) of the light guide element 23 of the second optical system is 20 mm. The diameter $\phi_L$ of the second light beam LF is a value (light beam diameter) of the second light beam LF in a plane perpendicular to the optical axis LX at the end of the light guide element 23 at the side of the phosphor wheel 26 (wavelength conversion element). When projected onto a plane perpendicular to the optical axis of the second optical system, the light guide element 23 has the following dimensions: $W_2$ (average length) is an average of the length of the second surface in a direction perpendicular to a ridge line formed by the first surface and the second surface, $\phi_L$ is the diameter of the second light beam on an optical surface immediately before the light guide element 23 in the second optical system, $H_i$ is distance between the optical axis LX of the second optical system and the center of the longer-side end surface 23c of a light incident side, and $H_o$ is distance between an optical axis LX of the second optical system and the center of the longer-side end surface 23d of a light emission side. Specific values for $W_2$, $\phi_L$, $H_i$, and $H_o$ are below:

$W_2$=0.64 mm;
$\phi_L$=20 mm;
$H_i$=7.07 mm; and
$H_o$=7.07 mm.

From $W_2$ and $\phi_L$ described above, $W_2/\phi_L$ is 0.032.

The ratio of $W_2$ to $\phi_L$ ($W_2/\phi_L$) is a gauge of the light quantity guided by the light guide element 23. Preferably, a conditional expression (1) below is satisfied.

$$0.018 < W_2/\phi_L < 0.035 \quad (1)$$

When $W_2/\phi_L$ of the conditional expression (1) is less than 0.018, the light quantity guided by the light guide element 32 is insufficient to obtain the effect of adjusting the illuminance distribution. When $W_2/\phi_L$ of the conditional expression (1) is larger than 0.032, the light quantity guided by the light guide element is excessively larger and difficult to adjust the illuminance distribution properly.

More preferably, a conditional expression (2) below is satisfied.

$$0.022 < W_2/\phi_L < 0.033 \quad (2)$$

The illuminance distribution on the screen 17 may be evaluated by a method different from the method described above. For example, the number of regions on the screen 17 for obtaining the average of the illuminance distribution may be other than nine. In addition, the shape of each region on the screen 17 may be other than the rectangle equally divided.

Figure 7:
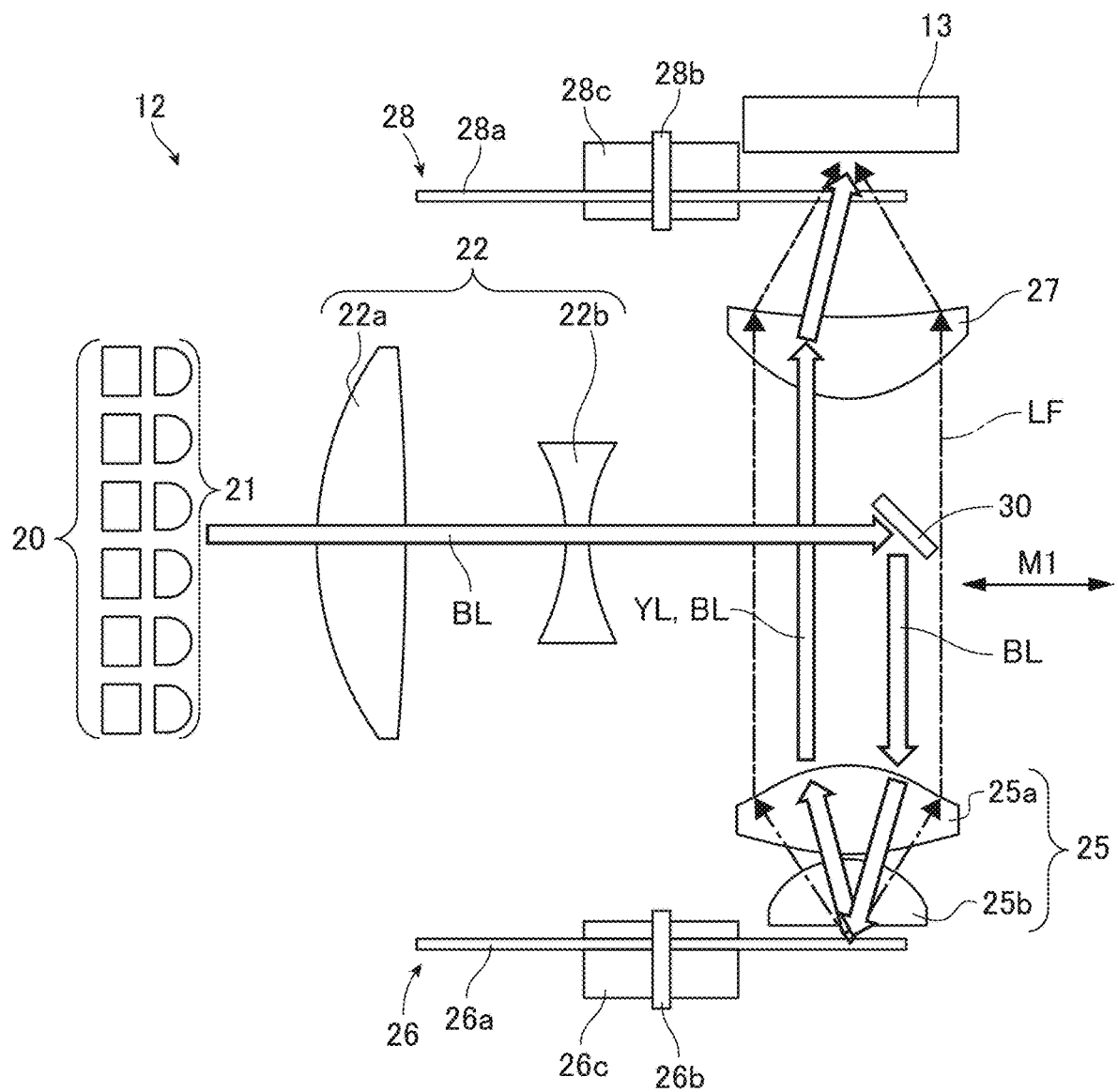
FIG. 7 is an illustration of a light source device according to a second embodiment.

FIG. 7 is an illustration of the light source device 12 according to the second embodiment. The light source device 12 of the second embodiment includes a light guide element 30 instead of the light guide element 23 according to the first embodiment.

Figure 8:
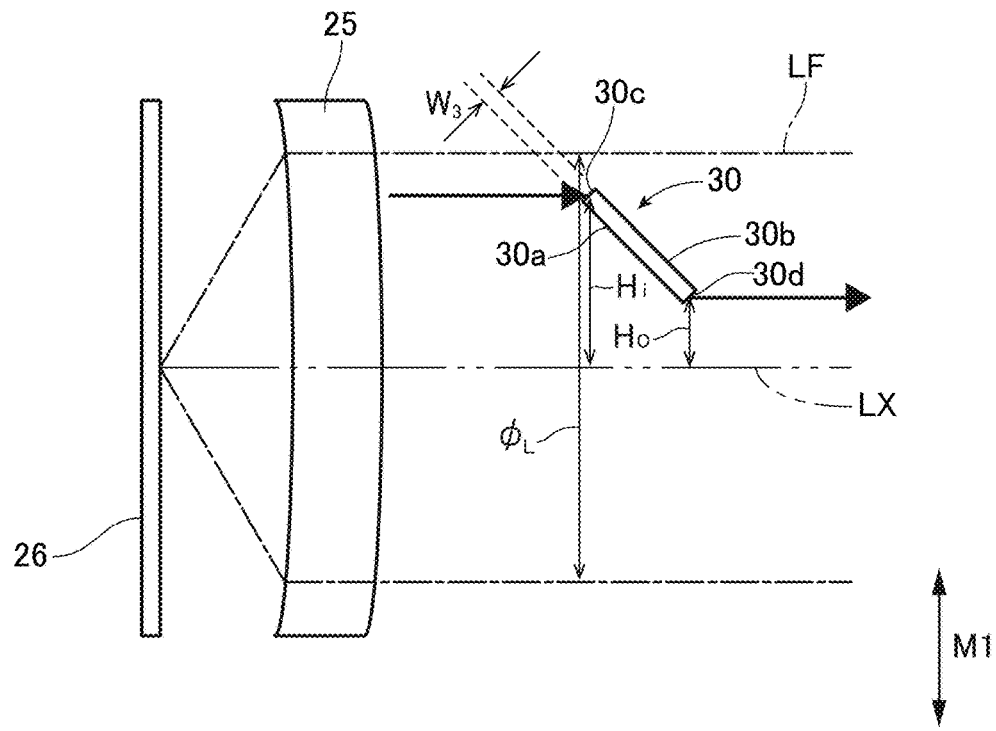
FIG. 8 is a side view of a configuration of a light guide element according to the second embodiment.

In the propagation direction (the direction MD of the first light beam emitted from the laser light source group 20 toward the light guide element 30, the light guide element 30 is offset from the optical axis LX (i.e., offset configuration) in FIG. 8. The light guide element 30 is a dichroic mirror, instead of a polarization beam splitter such as the light guide element 23, that reflects light in the wavelength band of the excitation light BL and transmits light in the wavelength band of the fluorescence light YL. There is no quarter-wave plate between the light guide element 30 and the second lens group 25 (i.e., non quarter-wave plate configuration). The second embodiment differs from the first embodiment in the offset configuration, the dichroic mirror, and non quarter-wave plate configuration. Other portions of the configuration are the same as those of the light source device 12 according to the second embodiment. Hereinafter, in descriptions on the second embodiment, the common descriptions between the first and the second embodiments are omitted.

The light guide element 30 is, for example, a parallel flat plate of a transparent material such as glass or plastic and has a front surface 30a and a back surface 30b parallel to each other. The front surface 30a of the light guide element 30 has a coating that reflects light in the wavelength band of the excitation light BL and transmits light in the wavelength band of the fluorescence light YL so that the light guide element 30 works as a dichroic mirror.

Figure 9:
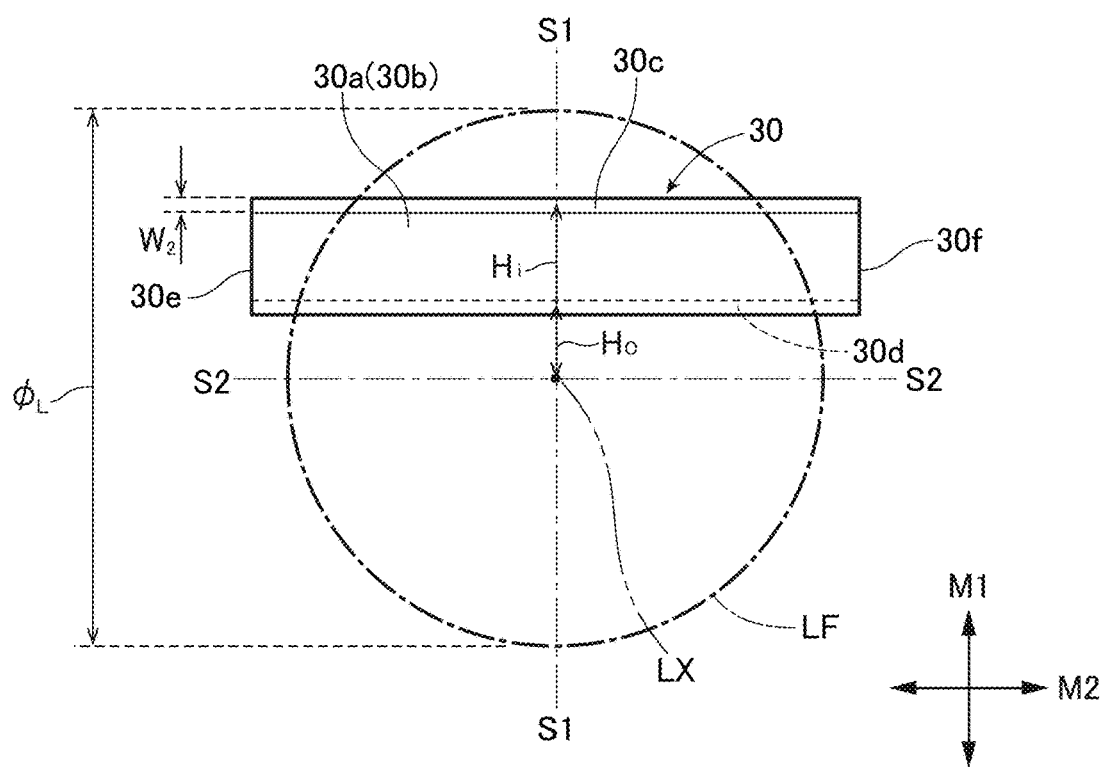
FIG. 9 is a front view of a configuration of the light guide element according to the second embodiment.

As illustrated in FIG. 9, when a virtual plane S1 including the optical axis LX along the M1 direction and the virtual plane S2 including the optical axis LX along the direction M2 are set, the configuration of the light guide element 30 as viewed from the front and back sides along the optical axis LX is symmetrical with respect to the virtual plane S1 (i.e., the virtual plane S1 passes through the center of longer-side of the light guide element 30). On the other hand, the light guide element 30 as viewed from the front and back sides does not intersect with the virtual plane S2 and is offset from the optical axis LX in the direction M1.

The first light beam emitted from the laser light source group 20 enters the phosphor wheel 26 through the first optical system from the first lens group 22 to the second lens group 25. In addition, the second light beam having the wavelength converted by the phosphor wheel 26 (i.e., the second light beam wavelength-converted from the first light beam by the wavelength conversion element) enters the color wheel 28 through the second optical system from the second lens group 25 to the third lens group 27. The fluorescent light YL passes through the light guide element 30 in a region in which the light guide element 30 is disposed in the second optical system, and the fluorescent light YL and the excitation light BL pass through a region in which the light guide element 30 is not disposed in the second optical system and reach the color wheel 28. Since the light guide element 30 is offset from the optical axis LX in the M1 direction, the excitation light BL can pass through a wider region including the vicinity of the optical axis LX in the second optical system.

As illustrated in FIGS. 8 and 9, the light guide element 30 includes four end surfaces: a longer-side end surface 30c (a first end surface); a longer-side end surface 30d (a second end surface); a shorter-side end surface 30e; and a shorter-side end surface 30f, where the longer-side end surface 30c and the longer-side end surface 30d are a parallel pair and extending along the longer-side of the light guide element 30, and the shorter-side end surface 30e and the shorter-side end surface 30f are a parallel pair and are extending along the shorter-side of the light guide element 30. The longer-side end surface 30c, the longer-side end surface 30d, the shorter-side end surface 30e, and shorter-side end surface 30f are substantially perpendicular to the front surface 30a and the back surface 30b. The longer-side end surface 30c and the longer-side end surface 30d are also substantially perpendicular to the shorter-side end surface 30e and the shorter-side end surface 30f. The light guide element 30 is supported and fixed by a support member in the vicinity of the shorter-side end surface 30e and the shorter-side end surface 30f at outside the second light beam LF.

As illustrated in FIG. 8, the light guide element 30 is disposed so that the front surface 30a and the back surface 30b are tilted by about 45 degrees with respect to the optical axis LX as viewed in the direction M2 (i.e., as viewed from the shorter-side end surface 30e and the shorter-side end surface 30f). In the direction along the optical axis LX, the front surface 30a faces the phosphor wheel 26, or the second lens group 25, and the back surface 30b faces the color wheel 28, or the third lens group 27.

In the light guide element 30 as viewed from the front side along the optical axis LX, as illustrated in FIG. 9, the front surface 30a and the longer-side end surface 30c face the phosphor wheel 26. The front surface 30a having a larger projection area as viewed from the front side is a first surface, and the longer-side end surface 30c having a smaller projection area is a second surface. A first light beam is reflected toward the phosphor wheel 26 by the front surface 30a as the first surface.

In the light guide element 30 as viewed from the back side along the optical axis LX, the back surface 30b and the longer-side end surface 30d face the color wheel 28, and the third lens group 27. A projection area of the back surface 30b is larger than that of the longer-side end surface 30d as viewed from the back side.

In the direction M1, the length of the light guide element 30 in the shorter-side direction as viewed from the front side is entirely within the range of the second light beam LF. In other words, in the direction M1, both the longer-side end surface 30c and the longer-side end surface 30d are within the range of the optical path through which the second light beam LF passes.

In the direction M2, the length of the light guide element 30 in the longer-side direction thereof is slightly larger than the diameter of the second light beam LF, and portions of each end of the light guide element 30 around the longer-side end surface 30c and the longer-side end surface 30d, in the longer-side direction are outside the range of the second light beam LF.

In other words, the front surface 30a, the back surface 30b, the longer-side end surface 30c, and the longer-side end surface 30d of the light guide element 30 are disposed within the diameter of the second light beam LF excluding the portions of the ends of the light guide element 30 in the direction M2 (i.e., the longer-side direction). In contrast, the shorter-side end surface 30e and the shorter-side end surface 30f are disposed outside the range of the second light beam LF.

As illustrated in FIG. 8, a portion of the second light beam LF enters the light guide element 30 from the longer-side end surface 30c and propagates through the light guide element 30 while repeating total internal reflection multiple times to exit from the longer-side end surface 30d. The light guide element 30 separates a portion of the second light beam from the second light beam LF in the second optical system. In other words, a portion of the second light beam passes through the light guide element 30. As a result, in the second optical system, the distribution of light quantity in the second light beam LF differs before and after the light guide element 30.

Unlike the light guide element 23 according to the first embodiment, the light guide element 30 is arranged to offset in the direction M1 without intersecting the optical axis LX. The longer-side end surface 30c on which a portion of the second light beam LF is incident is disposed in the vicinity of a peripheral portion of the second light beam LF. In addition, the longer-side end surface 30d from which the light that propagates in the light guide element 30 is emitted is disposed in the vicinity of the center close to the optical axis LX. The light guide element 30 works to bring a portion of the second light beam LF passing through a peripheral portion of the light guide element 30 closer to the optical axis LX in the direction M1. In other words, the light guide element 30 in the second optical system has a function to adjust the illuminance distribution to brighten the vicinity of the center of the image display element 15 and the screen 17.

The light guide element 30 has the length of the diameter of the second light beam LF. This configuration enables the entirely of the second light beam LF in the longer-side direction (i.e., the direction M2) of the light guide element 30 to undergo adjustment of the illuminance distribution by the light guide element 30.

FIG. 10 is an illustration of the results of the experiments and measurements demonstrating reduction in the unevenness of the illuminance distribution by the light guide element 30. In FIG. 10, the graph of the "example" is an illuminance distribution on the screen 17 obtained by an experiment using the light guide element 30 that separated (guided) a portion of the second light beam from the second light beam LF and the graph of "comparative example" is an illuminance distribution on the screen 17 obtained by an experiment without guiding light by the light guide element 30. In the example, the longer-side end surface 30c and the longer-side end surface 30d of the light guide element 30 were configured to transmit light (i.e., transmission surface), and the light entered the light guide element 30 from the longer-side end surface 30c and exited from the longer-side end surface 30d of the light guide element 30. In the comparative example, the longer-side end surface 30c and the longer-side end surface 30d of the light guide element 30 were configured to absorb light (i.e., absorption surface), and the light did not enter the light guide element 30 from the longer-side end surface 30c and did not exit from the longer-side end surface 30d of the light guide element 30. When a full-on image (i.e., all pixels in the image display element 15 are on) was projected onto the screen 17 under the same conditions condition excluding the difference between the transmission surface and the absorption surface described above, the illuminance distribution illustrated in FIG. 10 was obtained.

As illustrated in FIG. 10, an unevenness of an illuminance distribution in the example is smaller than that in the comparative example, and the unevenness of illuminance distribution on the screen 17 reduces. In particular, in an area from the center close to the upper of the screen 17 in FIG. 10, the unevenness of the illuminance distribution of the example is smaller than that of the comparative example.

The unevenness of the illuminance distribution on the screen 17 was evaluated according to the same evaluation criteria as in the first embodiment. In FIG. 10, Table 3 represents the average of the illuminance of each of the nine regions on the screen 17 in the example, and Table 4 represents the average of the illuminance of each of the nine regions on the screen 17 in the comparative example. In the second embodiment, the averages of the illuminance calculated based on the values of Tables 3 and 4 are 90.8% in the example and 90.0% in the comparative example. Thus, the unevenness of illuminance distribution on the screen 17 reduces in the example as compared with the comparative example.

In the present embodiment, the angle formed by the normal line of the second surface (the longer-side end surface 30c) of the light guide element 30 and the optical axis LX of the second optical system is 45 degrees, an average $W_3$ of a length of the second surface (the longer-side end surface 30c) in a direction perpendicular to the ridge line formed by the first surface (the longer-side end surface 30c) and the second surface (the longer-side end surface 30c) of the light guide element 30 is 0.7 mm, and the diameter $\phi_L$ of the second light beam LF at the position of the ridge line formed by the first surface (the front surface 30a) and the second surface (the longer-side end surface 30c) of the light guide element 30 of the second optical system is 20 mm. The diameter $\phi_L$ of the second light beam LF is a value (light beam diameter) of the second light beam LF in a plane perpendicular to the optical axis LX at the end of the light guide element 30 at a side of the phosphor wheel 26 (the wavelength conversion element).

Specific values for $W_2$, $\phi_L$, $H_i$, and $H_o$ are below:
$W_2$=0.49 mm;
$\phi_L$=20 mm;
$H_i$=8.04 mm; and
$H_o$=0.96 mm.

Thus, the ratio of $W_2$ to $\phi_L$ ($W_2/\phi_L$) is 0.025, which satisfies conditional expressions (1) and (2).

In the light source device 12 according to the third embodiment, a configuration of the light guide element 31 as viewed from the front and the back sides along the optical axis LX is illustrated in FIG. 11. In the third embodiment, the configuration excluding the light guide element 31 is the same as the configuration of the second embodiment, in which the common descriptions of the third embodiment and the second embodiment are omitted.

The light guide element 31 is, for example a parallel flat plate of transparent material such as glass or resin, and a front surface 31a, a back surface 31b, a longer-side end surface 31c (a first end surface), a longer-side end surface 31d (a second end surface), a shorter-side end surface 31e, and a shorter-side end surface 31f are corresponding to the front surface 30a, the back surface 30b, the longer-side end surface 30c (the first end surface), the longer-side end surface 30d (the second end surface), the shorter-side end surface 30e, and the shorter-side end surface 30f of the light guide element 30 according to the second embodiment.

The configuration of the light guide element 31 is asymmetrical with respect to both the virtual plane S1 including the optical axis LX along the direction M1 and the virtual plane S2 including the optical axis LX along the direction M2. More specifically, the light guide element 31 is offset from the optical axis LX in the direction M1, which is the same as the light guide element 30 of the second embodiment and does not intersect with the virtual plane S2. Furthermore, in the light guide element 31, the shorter-side end surface 31e is offset so that the shorter-side end surface 31e is closer to the virtual plane S1 than the shorter-side end surface 31f. As a result, the shorter-side end surface 31e is disposed within the diameter of the second light beam LF. In other words, the configuration of the light guide element 31 is asymmetrical with respect to the virtual planes S1 and S2, the direction M1 and the direction M2, and the optical axis LX. In the direction M2, the light guide element 31 is divided into two portions: one portion is disposed within the second light beam LF and light is guided; and the other portion is disposed outside the second light beam LF and light is not guided. The light guide element 31 is supported and fixed by a support member in the vicinity of the shorter-side end surfaces 31f disposed outside the second light beam LF.

The virtual plane S1 includes the optical axis LX of the second optical system and the light beams before and after passing through the light guide element 31 (i.e., it is longitudinally across both the longer-side end surface 31c and the longer-side end surface 31d). Since the configuration of the light guide element 31 is asymmetrical with respect to the virtual plane S1 and the optical axis LX in the direction M2, a latitude of adjusting the illumination distribution on the image display element 15 and the screen 17 increases.

Although the configuration of the light guide element 31 illustrated in FIG. 11 is asymmetrical with respect to both the virtual plane S1 and the virtual plane S2, a configuration of the light guide element 31 may be symmetrical with respect to the virtual plane S2 and asymmetrical with respect to the virtual plane S1.

Figure 12:
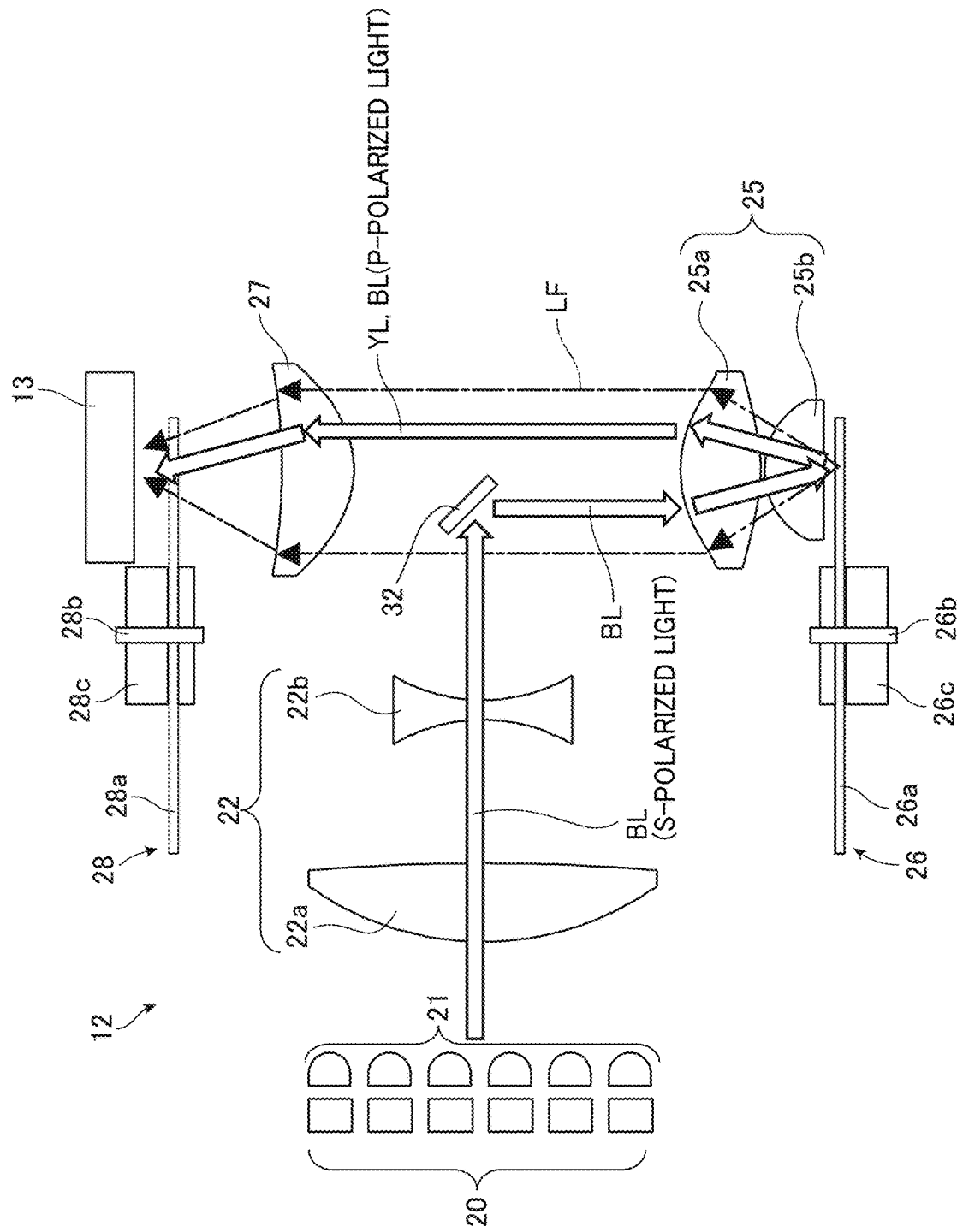
FIG. 12 is a schematic view of a configuration of a light source device according to a fourth embodiment.

FIG. 12 is a schematic view of a configuration of a light source device 12 according to the fourth embodiment. The light source device 12 of the fourth embodiment is different from that of the third embodiment in the configuration of the light guide element 32. In the fourth embodiment, the configuration excluding the light guide element 32 is the same as the configuration of the third embodiment. Hereinafter, in descriptions on the fourth embodiment, the common descriptions between the third and the fourth embodiments are omitted.

Figure 13:
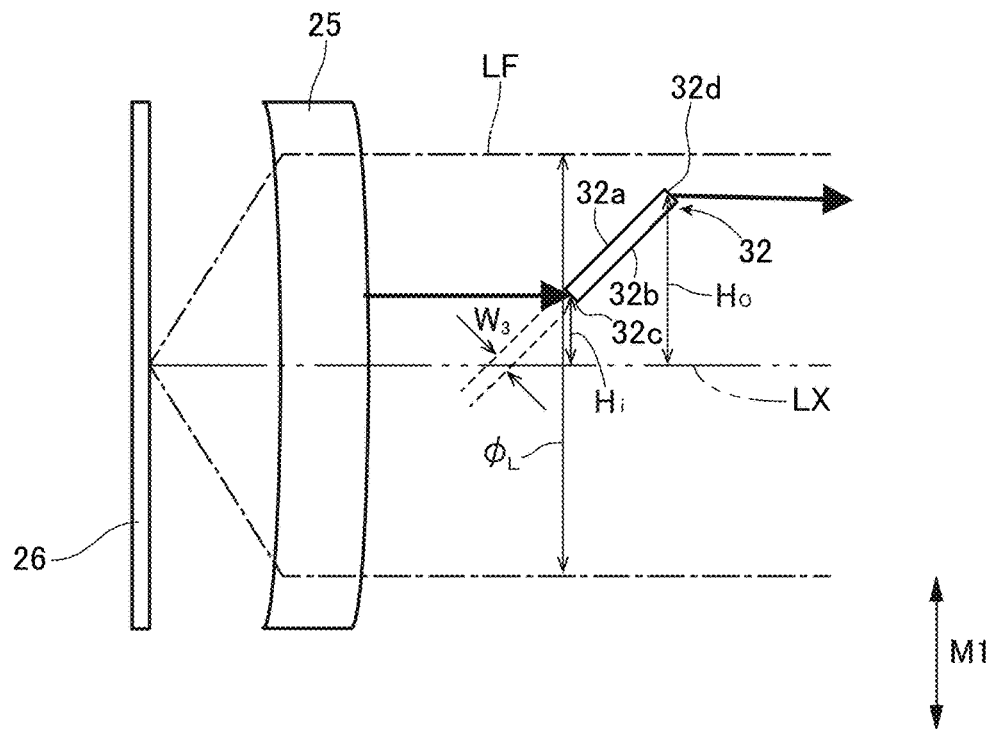
FIG. 13 is a side view of a configuration of a light guide element according to the fourth embodiment.
Figure 14:
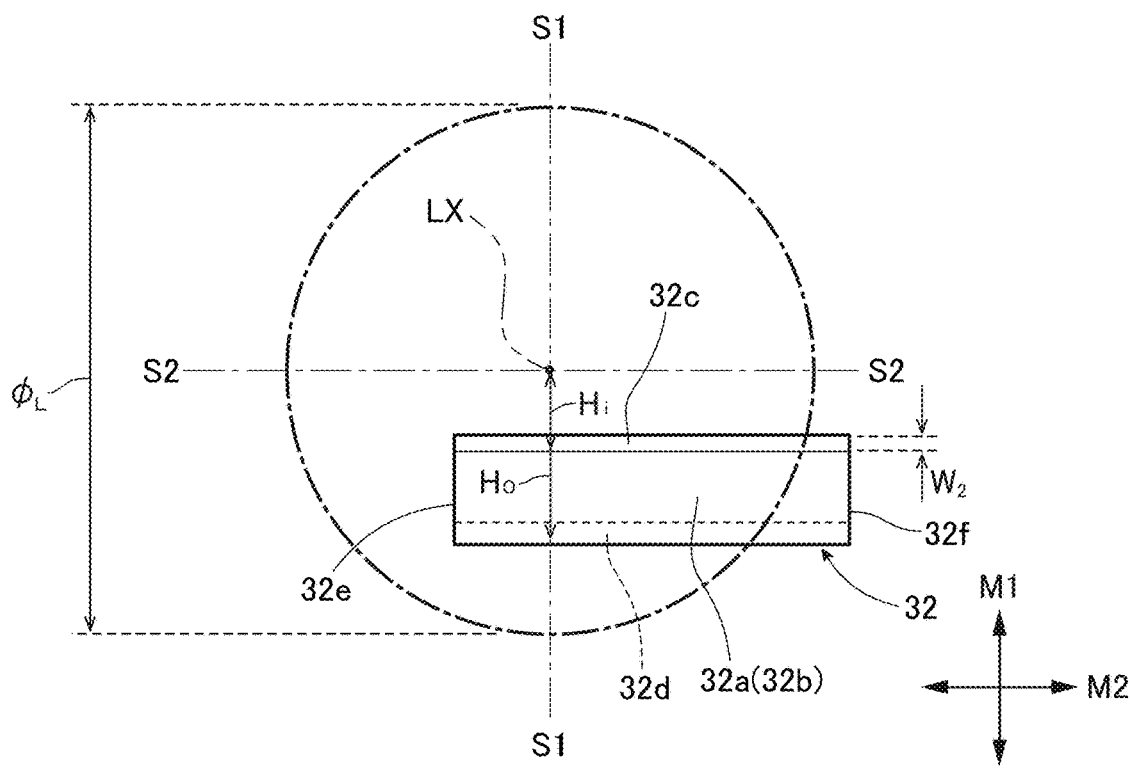
FIG. 14 is a front view of a configuration of the light guide element according to the fourth embodiment.

FIGS. 13 and 14 are schematic views of a configuration of the light guide element 32 according to the fourth embodiment. A front surface 32a, a back surface 32b, a longer-side end surface 32c, a longer-side end surface 32d, a shorter-side end surface 32e, and a shorter-side end surface 32f of the light guide element 32 illustrated in FIGS. 13 and 14 are corresponding to the front surface 31a, the back surface 31b, the longer-side end surface 31c (the first end surface), the longer-side end surface 31d (the second end surface), the shorter-side end surface 31e, and the shorter-side end surface 31f of the light guide element 31. The fourth embodiment is different from the third embodiment in a configuration of the light guide element 32. In the configuration of the light guide element 32 according to the fourth embodiment, the light guide element 32 is disposed in a place closer to the first optical system and farther from the second virtual surface S2 including the optical axis LX along the direction M2. Other portions of the configuration are the same as those of the light source device 12 according to the third embodiment. Hereinafter, in a description on the fourth embodiment, the common descriptions between the third and the fourth embodiments are omitted. The light guide element 32 is supported and fixed by a support member in the vicinity of the shorter-side end surfaces 32f disposed outside the second light beam LF.

As illustrated in FIG. 13, a portion of the second light beam LF enters the light guide element 32 from the longer-side end surface 32c and propagates through the light guide element 32 while repeating total internal reflection multiple times to exit from the longer-side end surface 32d. The light guide element 32 separates a portion of the second light beam from the second light beam LF in the second optical system. In other words, a portion of the second light beam passes through the light guide element 30. As a result, in the second optical system, the distribution of the light quantity in the second light beam LF differs before and after the light guide element 32.

As illustrated in FIG. 13, in the light guide element 32, the longer-side end surface 32c on which a portion of the second light beam LF is incident is disposed on the side of the center close to the optical axis LX. In addition, the longer-side end surface 32d to emit light that propagates in the light guide element 32 is disposed in the vicinity of a peripheral portion of the second light beam LF. The light guide element 32 works to keep away a portion of the of the second light beam LF in the vicinity of the center of the second light beam LF from the optical axis LX in the direction M1. In other words, the light guide element 32 in the second optical system has an effect to adjust the illuminance distribution to brighten the vicinity of the periphery of the image display element 15 and the screen 17.

FIG. 15 is an illustration of the results of experiments and measurements demonstrating reduction in the unevenness of the illuminance distribution by the light guide element 32 according to the fourth embodiment. In FIG. 15, the graph of the "example" is an illuminance distribution on the screen 17 obtained by an experiment using the light guide element 32 that separated (guided) a portion of the second light beam from the second light beam LF and the graph of "comparative example" is an illuminance distribution on the screen 17 obtained by an experiment without guiding light by the light guide element 32. In the example, the longer-side end surface 32c and the longer-side end surface 32d of the light guide element 32 were configured to transmit light (i.e., transmission surface), and the light entered the light guide element 32 from the longer-side end surface 32c and exited from the longer-side end surface 32d of the light guide element 32. In the comparative example, the longer-side end surface 32c and the longer-side end surface 32d of the light guide element 32 were configured to absorb light (i.e., absorption surface), and the light did not enter the light guide element 32 from the longer-side end surface 32c and did not exit from the longer-side end surface 32d of the light guide element 32. When a full-on image (i.e., all pixels in the image display element 15 are on) was projected onto the screen 17 under the same conditions condition excluding the difference between the transmission surface and the absorption surface described above, the illuminance distribution illustrated in FIG. 15 was obtained.

As illustrated in FIG. 15, an unevenness of an illuminance distribution in the example is smaller than that in the comparative example, and the unevenness of illuminance distribution on the screen 17 reduces. In particular, in an area from the center close to the upper of the screen 17 in FIG. 15, the unevenness of the illuminance distribution of the example is smaller than that of the comparative example.

The unevenness of illuminance on the screen 17 was evaluated according to the same evaluation criteria as in the first embodiment. In FIG. 15, Table 5 represents the average of the illuminance of each of the nine regions on the screen 17 in the example, and Table 6 represents the average of the illuminance of each of the nine regions on the screen 17 in the comparative example. In the fourth embodiment, the averages of the illuminance calculated based on the values of Tables 5 and 6 is 89.4% in the example and 89.1% in the comparative example. Thus, the unevenness of the illuminance distribution on the screen 17 reduces in the example as compared with the comparative example.

In the present embodiment, an angle formed by the normal line of the second surface (the longer-side end surface 32c) of the light guide element 32 and the optical path LX of the second optical system is 45 degrees, an average $W_3$ of a length of the second surface (the longer-side end surface 32c) in a direction perpendicular to the ridge line formed by the first surface (the front surface 32a) and the second surface (the longer-side end surface 32c) of the light guide element 32 is 0.7 mm, and the diameter $\phi_L$ of the second light beam LF at the position of the ridge line formed by the first surface (the front surface 32a) and the second surface (the longer-side end surface 32c) of the light guide element 32 of the second optical system is 21 mm. The diameter $\phi_L$ of the second light beam LF is a value on a plane perpendicular to the optical axis LX at the end of the light guide element 32 at a side of the phosphor wheel 26 (the wavelength conversion element).

Specific values for $W_2$, $\phi_L$, $H_i$, and $H_o$ are below:
$W_2$=0.49 mm;
$\phi_L$=21 mm;
$H_i$=0.96 mm; and
$H_o$=8.04 mm.

The ratio of $W_2$ to $\phi_L$ ($W_2/\phi_L$) is 0.024, which satisfies the conditional expressions (1) and (2).

The ratio of $H_i$ to $\phi_L$ ($H_i/\phi_L$) is 0.046.

The ratio of $H_i$ to $\phi_L$ ($H_i/\phi_L$) is an index indicating a positional ratio of a portion of light separated by the light guide element in the second light beam to the diameter of the second light beam. In a case where light is guided by the light guide element so as to be farther from the optical axis. Preferably, a conditional expression (3) below is satisfied.

$$H_i/\phi_L < 0.1 \tag{3}$$

In general, since light quantity is larger in the vicinity of the optical axis LX in the second light beam LF, a way of guiding light from the vicinity of the center of optical axis LX to the vicinity of the peripheral of the optical axis by the light guide element is effective to adjust to reduce the unevenness of the illuminance distribution. When the ratio of $H_i$ to $\phi_L$ ($H_i/\phi_L$) is larger than 0.1, the light guided by the light guide element is farther from the vicinity of the optical axis LX, and the unevenness of the illuminance distribution is difficult to reduce.

In the configuration of the light guide element 32 according to the fourth embodiment, the light in the vicinity of the center of the second light beam LF (i.e., a portion of the second light beam LF closer to the optical axis LX) is guided to a peripheral portion of the second light beam LF (i.e., a portion of the second light beam farther from the optical axis LX). When the light quantity in the vicinity of the center of the second light beam LF is larger, the configuration of the light guide element 32 according to the fourth embodiment is effective to adjust the light quantity in the second light beam LF. As a result, the illuminance distribution of the image display element 15 and the screen 17 is uniformized.

FIG. 16 is a schematic view of a configuration of the light source device 12 according to the fifth embodiment. In the light source device 12 according to the fifth embodiment, an arrangement of the light guide element 33 guides a center portion of light (i.e., a portion closer to the optical axis LX) in the second light beam LF to a peripheral portion (i.e., a portion farther from the optical axis LX). In the fourth embodiment, the light guide element 32 also guides a center portion of light in the second light beam LF to a peripheral portion. A front surface 33a, a back surface 33b, a longer-side end surface 33c, and a longer-side end surface 33d of the light guide element 33 are corresponding to the front surface 32a, the back surface 32b, the longer-side end surface 32c (the first end surface), and the longer-side end surface 32d (the second end surface) of the light guide element 32 (FIG. 13) according to the fourth embodiment.

In the fifth embodiment, an angle formed by the optical axis LX and a normal line of the second surface (the longer-side end surface 33c) of the light guide element 33 is 35 degrees, and the optical axis of the first optical system tilts by 20 degrees so that the first light beam reflected by the first surface (the front surface 33a) of the light guide element 33 hits the wavelength conversion element (the phosphor wheel 26), that is, the incident angle on the first surface (the front surface 33a) of the light guide element 33 is 55 degrees, which is different from the fourth embodiment. The normal line of the second surface (the longer-side end surface 33c) of the light guide element 33 is closer to the direction of the optical axis LX of the second optical system than the normal line of the second surface of the light guide element 32 according to the fourth embodiment. The normal line of the first surface (the front surface 33a) of the light guide element 33 is farther from the direction of the optical axis LX of the second optical system. The angle formed by the normal line of the second surface (the longer-side end surface 33c) and the optical axis LX of the second optical system is 35 degrees, and an angle formed by the normal line of the first surface (the front surface 33a) and the second optical axis LX is 55 degrees. The angle formed by the normal line of the second surface (the longer-side end surface 33c) and the optical axis LX of the second optical system is smaller than the angle formed by the normal line of the first surface (the front surface 33a) and the optical axis LX of the second optical system. Other portions of the configuration according to the fifth embodiment are the same as those of the light source device 12 according to the fourth embodiment. Hereinafter, in descriptions on the fifth embodiment, the common descriptions between the fourth and the fifth embodiments are omitted.

As illustrated in FIG. 16, the laser light source group 20, the collimator lens group 21, and the first lens group 22 are configured to match the configuration of the light guide element 33. The excitation light BL emitted from the first lens group 22 is reflected by the first surface (the front surface 33a) of the light guide element 33 and enters the second lens group 25 along the optical axis LX.

In the light source device 12 according to the fifth embodiment: the angle formed by the normal line of the second surface (the longer-side end surface 33c) of the light guide element 33 and the optical axis LX is 35 degrees; the average length $W_3$ of the second surface (the longer-side end surface 33c) in a direction perpendicular to the ridge line formed by the first surface (the longer-side end surface 33c) and the second surface (the longer-side end surface 33c) of the light guide element 33 is 0.7 mm; and diameter $\phi_L$ of the second light beam LF at the position of the ridge line formed by the first surface and the second surface (the longer-side end surface 33c) is 20 mm. The diameter $\phi_L$ of the second light beam LF is a value on a plane perpendicular to the optical axis LX at the end of the light guide element 33 at a side of the phosphor wheel 26 (the wavelength conversion element).

Specific values for $W_2$, $\phi_L$, $H_i$, and $H_o$ are below:
$W_2$=0.57 mm;
$\phi_L$=20 mm;
$H_i$=1.63 mm; and
$H_o$=7.37 mm.
Thus, the ratio of $W_2$ to $\phi_L$ ($W_2/\phi_L$) is 0.029, which satisfies the conditional expressions (1) and (2).

The ratio $H_i$ to $\phi_L$ ($H_i/\phi_L$) is 0.082, which satisfies the conditional expression (3).

In the light source device 12 according to the fifth embodiment, the angle formed by the normal line of the second surface (the longer-side end surface 33c) of the light guide element 33 and the optical axis LX of the second optical system is smaller than the angle formed by the normal line of the first surface (the front surface 33a) and the optical axis LX of the second optical system, so that the light quantity incident on the second surface (the longer-side end surface 33c) and guided by the light guide element 33 can be increased. Thus, the ratio of $W_2$ to $\phi_L$ ($W_2/\phi_L$) increases. In the light source device 12 according to the fifth embodiment, the light guide element 33 can efficiently adjust the distribution of light quantity of the light beam LF.

In each of the embodiments described above, the longer-side end surface 23c (30c, 31c, 32c, 33c) and the longer-side end surface 23d (30d, 31d, 32d, 33d) of the light guide element 23 (30, 31, 32, 33) are parallel to each other (i.e., parallel configuration). The parallel configuration is preferable because the directions of incidence and emission of light separated by the light guide element 23 (30, 31, 32, 33) in the second optical system align. In one or more embodiments, a first end surface corresponding to the longer-side end surface 23c (30c, 31c, 32c, 33c) and a second end surface corresponding to the longer-side end surface 23d (30d, 31d, 32d, 33d) may be non-parallel.

In each of the embodiments described above, the longer-side end surface 23c (30c, 31c, 32c, 33c) and the longer-side end surface 23d (30d, 31d, 32d, 33d) of the light guide element 23 (30, 31, 32, 33) are perpendicular to the front surface 23a (30a, 31a, 32a, 33a) and the back surface 23b (30b, 31b, 32b, 33b). In the first to fourth embodiments, the longer-side end surface 23c (30c, 31c, 32c) and the longer-side end surface 23d (30d, 31d, 32d) tilt by about 45 degrees with respect to the optical axis LX of the second optical system. In one or more embodiments, the angle of the first end surface or the second end surface of the light guide element with respect to the optical axis LX may be other than 45 degrees. For example, as in the fifth embodiment, by setting the angle of the first end surface or the second end surface with respect to the optical axis LX to be larger than 45 degrees (to be angled), the projection area in a view along the optical axis LX increases, and the proportion of the second light beam LF passing through the light guide element is increased.

The present invention is particularly useful in an image display apparatus (projector) that projects an image onto a projection surface. Moreover, the present invention can also apply to apparatuses or devices other than the image display apparatuses as long as an illuminance distribution is required to improve. The present invention can also apply to an optical system other than a projection optical system, for example, a light source optical system, a light source unit, or a light source device. In the light source optical system, the light source unit, and the light source device of the present invention, light emitted from the light source may be used in applications other than image projection.

Each of the embodiments described above is an application of a projector, and the illuminance distribution on the screen on which an image is projected by the projector is used as an evaluation reference as illustrated in FIGS. 6 and 10. However, the illuminance distribution may be evaluated at a place other than the screen to measure an improvement in the illuminance distribution. For example, the light source optical system, the light source unit, or the light source device can also be evaluated by measuring the illuminance distribution on the image display element 15 (i.e., a surface irradiated with the light from the light source device 12) in the embodiments described above.

Although the light source device 12 of the embodiment described above emits light of multiple colors in a time-division manner, the light source device or the light source unit of the present invention is not limited to a light source device or a light source unit that emits light of multiple colors in a time-division manner.

Although the present invention has been described with reference to the embodiments and the modifications based on the accompanying drawings, the present invention is not limited to the embodiments described above and modifications, and various modifications and applications can be made without departing from the scope of the present invention.

In the embodiment described above, the configuration and the like illustrated in the accompanying drawings are not limited thereto, and can be appropriately changed within a range in which the effects of the present invention are exhibited. In addition, the present invention can be implemented with appropriate modifications without departing from the spirit of the present invention. The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A light source optical system comprising:
   a first optical system to guide a first light beam having a first wavelength emitted from a light source to a wavelength conversion element;
   the wavelength conversion element to convert the first light beam into a second light beam having a second wavelength different from the first wavelength, and emit the second light beam; and
   a second optical system through which the second light beam emitted from the wavelength conversion element passes, the second optical system including a light guide element to guide a portion of the second light beam from one end surface of the light guide element to the other end surface of the light guide element to separate the portion of the second light beam from the second light beam,
   wherein the light guide element includes:
   a first surface,
   a second surface that the portion of the second light beam enters,
   a third surface, and
   a fourth surface,
   wherein a projection area of the second surface is smaller than that of the first surface, the projection area on a plane perpendicular to an optical axis of the second optical system,
   wherein a portion of the second light beam enters the light guide element from the second surface, propagates through the light guide element while repeating total internal reflection multiple times, and exits the light guide element from the fourth surface,
   wherein a projection area of the fourth surface on the plane perpendicular to the optical axis of the second optical system is smaller than a projection area of the third surface,
   wherein in a direction perpendicular to the optical axis of the second optical system, both the second surface and the fourth surface are within a range of the optical path through which the second light beam passes, and
   wherein a magnitude of the second light beam passing through the light guide element includes a magnitude of light entering the first surface which exits the third surface and a magnitude of light entering the second surface and exiting the fourth surface.

2. The light source optical system according to claim 1, wherein a conditional expression below is satisfied:

$$0.018 < W_2/\phi_L < 0.035$$

where, on the plane perpendicular to the optical axis of the second optical system, $W_2$ is an average length of the second surface in a direction perpendicular to a ridge line between the first surface and the second surface in a projection of the light guide element onto the plane, and $\phi_L$ is a diameter of the second light beam at one end of the light guide element closer to the wavelength conversion element along the optical axis.

3. The light source optical system according to claim 1, wherein the first surface of the light guide element reflects the first light beam toward the wavelength conversion element.

4. The light source optical system according to claim 1, wherein an angle between a normal line of the second surface and the optical axis of the second optical system is smaller than an angle between a normal line of the first surface and the optical axis of the second optical system.

5. The light source optical system according to claim 1, wherein the light guide element allows the portion of the second light beam to repeat the total internal reflection multiple times in the light guide element and exit from the light guide element.

6. The light source optical system according to claim 1, wherein the light guide element is a parallel flat plate having a first end surface and a second end surface, and allows the portion of the second light beam to enter the first end surface and exit from the second end surface.

7. The light source optical system according to claim 6, wherein the light guide element is asymmetrically arranged with respect to the optical axis of the second optical system in a direction in which the first end surface and the second end surface extend.

8. The light source optical system according to claim 1, wherein the light guide element is disposed intersecting with the optical axis of the second optical system to guide the portion of the second light beam from a region to another region across a plane including the optical axis of the second optical system.

9. The light source optical system according to claim 1, wherein the light guide element is to guide the portion of the second light beam to be closer to the optical axis of the second optical system.

10. The light source optical system according to claim 1, wherein the light guide element is to guide the portion of the second light beam to be farther from the optical axis of the second optical system.

11. The light source optical system according to claim 1, wherein:
the light exiting the third surface and the light exiting the fourth surface together are used to form an image on an irradiation surface.

12. The light source optical system according to claim 1, further comprising:
an image display element which receives the second light beam,
wherein an illumination distribution on the image display element includes light exiting third surface and light exiting the fourth surface.

13. A light source unit comprising:
a first optical system through which a first light beam emitted from a light source passes;
a wavelength conversion element configured to wavelength-convert the first light beam passed through the first optical system into a second light beam; and
a second optical system through which the second light beam passes,
the second optical system including a light guide element through which a portion of the second light beam passes,
wherein the light guide element includes:
a first surface,
a second surface that the portion of the second light beam enters,
a third surface, and
a fourth surface,
wherein a projection area of the second surface is smaller than that of the first surface, the projection area on a plane perpendicular to an optical axis of the second optical system,
wherein a portion of the second light beam enters the light guide element from the second surface, propagates through the light guide element while repeating total internal reflection multiple times, and exits the light guide element from the fourth surface,
wherein a projection area of the fourth surface on the plane perpendicular to the optical axis of the second optical system is smaller than a projection area of the third surface,
wherein in a direction perpendicular to the optical axis of the second optical system, both the second surface and the fourth surface are within a range of the optical path through which the second light beam passes, and
wherein a magnitude of the second light beam passing through the light guide element includes a magnitude of light entering the first surface which exits the third surface and a magnitude of light entering the second surface and exiting the fourth surface.

14. The light source unit according to claim 13, wherein:
the light exiting the third surface and the light exiting the fourth surface together are used to form an image on an irradiation surface.

15. The light source unit according to claim 13, further comprising:
an image display element which receives the second light beam,
wherein an illumination distribution on the image display element includes light exiting third surface and light exiting the fourth surface.

16. An image display apparatus comprising:
a light source device including:
a light source to emit a first light beam having a first wavelength;
a first optical system to guide the first light beam emitted from the light source to a wavelength conversion element;
the wavelength conversion element to convert the first light beam into a second light beam having a second wavelength different from the first wavelength, and emit the second light beam; and
a second optical system through which the second light beam passes, the second optical system including a light guide element to guide a portion of the second light beam from one end surface of the light guide element to the other end surface of the light guide element to separate the portion of the second light beam from the second light beam;
an image display element to modulate light from the light source device to form an image; and
a projection optical system to project the image onto a projection surface,
wherein the light guide element includes:
a first surface,
a second surface that the portion of the second light beam enters,
a third surface, and
a fourth surface,
wherein a projection area of the second surface is smaller than that of the first surface, the projection area on a plane perpendicular to an optical axis of the second optical system,
wherein a portion of the second light beam enters the light guide element from the second surface, propagates through the light guide element while repeating total internal reflection multiple times, and exits the light guide element from the fourth surface,
wherein a projection area of the fourth surface on the plane perpendicular to the optical axis of the second optical system is smaller than a projection area of the third surface,
wherein in a direction perpendicular to the optical axis of the second optical system, both the second surface and the fourth surface are within a range of the optical path through which the second light beam passes, and wherein a magnitude of the second light beam passing through the light guide element includes a magnitude of light entering the first surface which exits the third surface and a magnitude of light entering the second surface and exiting the fourth surface.

17. The image display according to claim 16, wherein:
the light exiting the third surface and the light exiting the fourth surface together are used to form an image on an irradiation surface.

18. The image display according to claim 16, wherein:
an illumination distribution on the image display element includes light exiting third surface and light exiting the fourth surface.

* * * * *